(12) United States Patent
Farkas et al.

(10) Patent No.: US 7,272,732 B2
(45) Date of Patent: Sep. 18, 2007

(54) CONTROLLING POWER CONSUMPTION OF AT LEAST ONE COMPUTER SYSTEM

(75) Inventors: Keith Istvan Farkas, San Carlos, CA (US); Gopalakrishnan Janakiraman, Sunnyvale, CA (US); Robert Stets, Palo Alto, CA (US); Chandrakant D. Patel, Fremont, CA (US); Christopher C. Wanner, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 10/608,206

(22) Filed: Jun. 30, 2003

(65) Prior Publication Data

US 2004/0268166 A1 Dec. 30, 2004

(51) Int. Cl.
*G06F 1/32* (2006.01)
(52) U.S. Cl. ......................... 713/320; 713/300; 713/340
(58) Field of Classification Search ................ 713/300, 713/320, 340
See application file for complete search history.

(56) References Cited

U.S. PATENT DOCUMENTS

| | | | | |
|---|---|---|---|---|
| 3,887,842 A | * | 6/1975 | Owens et al. ............... 315/397 |
| 4,653,940 A | * | 3/1987 | Katsukawa ............ 400/124.03 |
| 5,017,799 A | * | 5/1991 | Fishman ...................... 307/34 |
| 5,560,022 A | * | 9/1996 | Dunstan et al. ............. 713/300 |
| 5,579,524 A | * | 11/1996 | Kikinis ........................ 713/324 |
| 5,752,046 A | * | 5/1998 | Oprescu et al. ............. 713/300 |
| 5,801,961 A | * | 9/1998 | Moore et al. ................ 700/286 |
| 6,212,644 B1 | * | 4/2001 | Shimoda et al. ............ 713/324 |
| 2001/0003207 A1 | * | 6/2001 | Kling et al. ................. 713/320 |
| 2002/0152406 A1 | * | 10/2002 | Watts et al. ................. 713/300 |
| 2002/0171398 A1 | * | 11/2002 | Odaohhara ................... 320/128 |
| 2003/0015983 A1 | * | 1/2003 | Montero et al. ............ 318/473 |
| 2003/0023885 A1 | * | 1/2003 | Potter et al. ................ 713/300 |
| 2003/0065961 A1 | * | 4/2003 | Koenen ....................... 713/323 |
| 2003/0115000 A1 | * | 6/2003 | Bodas .......................... 702/60 |
| 2003/0125886 A1 | * | 7/2003 | Spitaels et al. ............... 702/62 |
| 2003/0126260 A1 | * | 7/2003 | Husain et al. ............... 709/225 |
| 2003/0126479 A1 | * | 7/2003 | Burns et al. ................ 713/300 |
| 2003/0154291 A1 | * | 8/2003 | Ocheltree et al. ........... 709/228 |
| 2003/0177406 A1 | * | 9/2003 | Bradley et al. ............. 713/300 |
| 2003/0188210 A1 | * | 10/2003 | Nakazato ..................... 713/320 |
| 2003/0204762 A1 | * | 10/2003 | Lee et al. .................... 713/322 |
| 2003/0224224 A1 | * | 12/2003 | Okada et al. .................. 429/7 |
| 2004/0003303 A1 | * | 1/2004 | Oehler et al. ............... 713/300 |
| 2004/0163001 A1 | * | 8/2004 | Bodas .......................... 713/300 |
| 2004/0264124 A1 | * | 12/2004 | Patel et al. .................. 361/686 |

* cited by examiner

*Primary Examiner*—Thomas Lee
*Assistant Examiner*—Vincent T Tran

(57) ABSTRACT

At least one computer system receives power from a power system having a maximum power output based on a nominal power consumption of the at least one computer system. The power system is operable to detect an amount of power consumed by the at least one computer system, and compare the power consumption to a threshold based on the maximum power output of the power supply. The power system is operable to place one or more components of the at least one computer system in a lower-power state to reduce power consumption in response to the amount of power consumed by the at least one computer system exceeding the threshold.

35 Claims, 10 Drawing Sheets

CONTROLLING POWER CONSUMPTION OF AT LEAST ONE COMPUTER SYSTEM

FIELD OF THE INVENTION

This invention relates generally to power systems. More particularly, the invention relates to power consumption of at least one computer system.

BACKGROUND OF THE INVENTION

Power supplies for computer systems are typically designed and selected for implementation based on the maximum power that may be consumed by the computer systems and based on the computer systems being fully provisioned. For example, when substantially all the components in a computer system are operating at full capacity, the computer system may be consuming the maximum amount of power (i.e., a maximum power consumption state). Also, a computer system may be upgraded (or provisioned) by adding or replacing components that demand more power. Typically, a power supply is used in a computer system that is capable of generating sufficient power to operate the components of the computer system during the maximum power consumption state when the computer system is fully provisioned.

A computer system, however, usually does not operate at full capacity (i.e., a maximum power consumption state) for a majority of its operation time. Instead the computer system may operate, for example, at 70%, 75%, 65%, etc. of the maximum power consumption state on the average. Furthermore, the computer system may not be provisioned, if ever, for a substantial period of time. Accordingly, much of the capacity of the power supply is not used for the majority of time the computer system is being used. Therefore, manufacturing and deployment costs for computer systems are increased as a result of using power supplies designed for the maximum power consumption of the computer systems. For example, if a smaller power supply were used (i.e., a power supply having a maximum output less than the maximum power consumption of a computer system using the power supply), the cost of the power supply for the computer system is reduced. In addition, the heat dissipation of a smaller power supply is typically less. Accordingly, it takes less power to cool the power supply, and a cooling system having a smaller cooling capacity may likely be used. Furthermore, smaller and cheaper accessory components (e.g., transformer, bus, wires, cooling system, etc.) for a computer power system may be used.

SUMMARY OF THE INVENTION

According to an embodiment, a method of controlling power consumption for at least one computer system comprises detecting an amount of power consumed by the at least one computer system; comparing the amount of power consumed by the at least one computer system to a threshold, wherein the threshold is based on the maximum power output of the power supply; and placing one or more components of the at least one computer system in a lower-power state to reduce power consumption in response to the amount of power consumed by the at least one computer system exceeding the threshold.

According to another embodiment, a power system generating power for at least one computer system comprises at least one power supply operable to provide power for the at least one computer system; a power monitor operable to determine the power consumption of the at least one computer system; and a power provisioning system operable to compare the power consumption of the at least one computer system to a threshold associated with a maximum capacity of the power supply, and further operable to place one or more components of the at least one computer system in a lower-power state in response to the measured power output exceeding the threshold.

According to yet another embodiment, a system comprises multiple computers housed in an enclosure; a cooling system operable to distribute cooling fluid to the multiple computer systems in the enclosure based on one or more of the power consumption and heat dissipation of the multiple computer systems; and a power system connected to the cooling system and including a power supply operable to generate power for the multiple computer systems and a power provisioning system, wherein the power provisioning system is operable to control power consumption of at least one of the multiple computer systems based on the availability of cooling resources for cooling the multiple computer systems.

According to yet another embodiment, an apparatus controlling power consumption of at least one computer system comprises means for determining an amount of power consumed by the at least one computer system; means for comparing the amount of power to a threshold, wherein the threshold is based on the maximum power output of the power supply means; and means for placing one or more components of the at least one computer system in a lower-power state to reduce power consumption in response to the power consumption of the at least one computer system exceeding the threshold.

According to yet another embodiment, a method of designing a computer system comprises selecting components for the computer system and selecting a power supply for the computer system based on a nominal power consumption of the components being used in the computer system. The nominal power consumption is a power consumption less than a maximum power consumption of the components being used in the computer system. The method further comprises assembling the computer system, wherein the computer system includes the selected components and the selected power supply.

BRIEF DESCRIPTION OF THE DRAWINGS

The present invention is illustrated by way of example and not limitation in the accompanying figures in which like numeral references refer to like elements, and wherein.

DETAILED DESCRIPTION OF A PREFERRED EMBODIMENT

Figure 1:
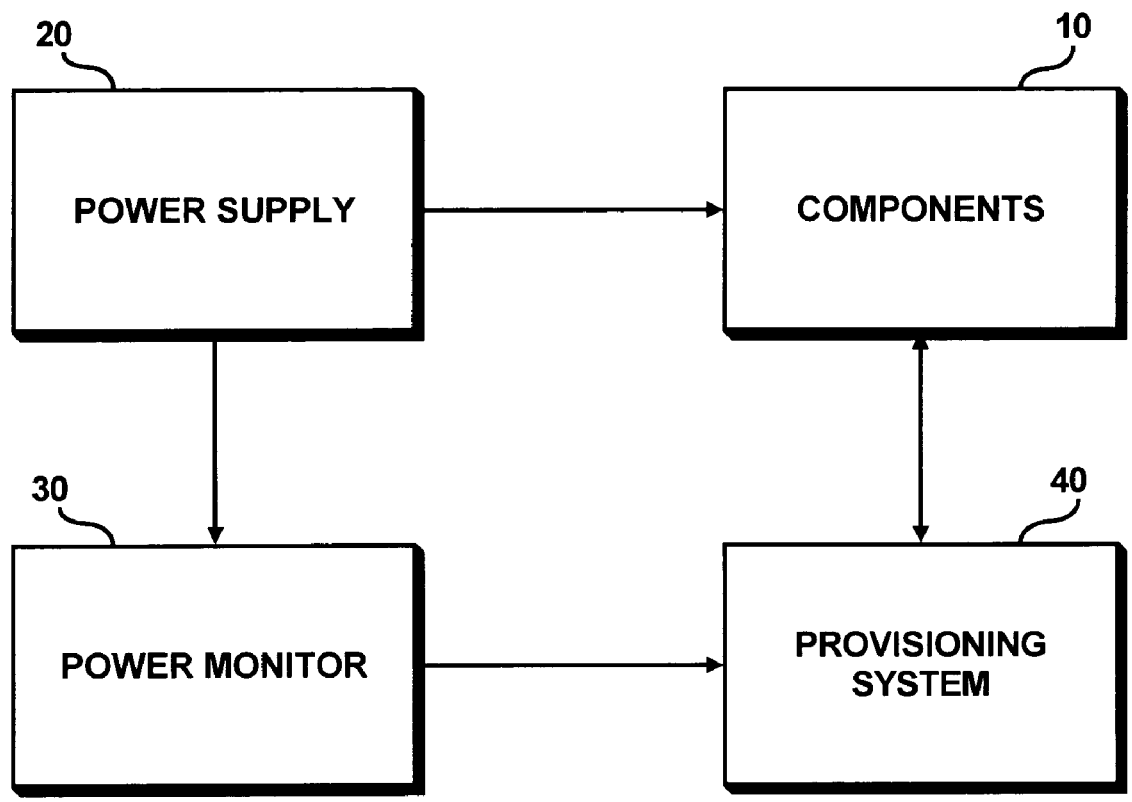
FIG. 1 illustrates a block diagram of a computer system, according to an embodiment of the invention.

According to an embodiment, a power supply for one or more computer systems is selected and implemented based on a nominal power consumption of the computer system rather than based on a maximum power consumption of the computer system. For example, a nominal power consumption may be estimated based on the average power consumed by the components of a computer system, or nominal power consumption may be a standard deviation of the average power consumption. Specifications provided by component manufacturers and/or actual power consumption measurements may be used to determine average power consumption for the computer system. Other statistical techniques may be used to determine nominal power consumption, which may be based on actual measurements or estimations of power consumption. Alternatively, the nominal power consumption may be based on the power consumption of a computer system running a typical workload (e.g., the workload the computer system may run for a majority of its operation time). The workload of a computer system may be known or estimated by historical measurements of workload, monitoring workload of existing computer systems, or by testing.

A power supply that is operable to generate at least the nominal power consumption is implemented for one or more computer systems. For example, the power supply implemented for the computer systems may have a maximum power output that is approximately equal to or within a predetermined tolerance of the nominal power consumption of the computer system.

Generally, the power supply that is implemented for the computer systems is smaller than a power supply designed for a maximum power consumption state of the computer systems. Accordingly, the power supply costs are typically reduced. In addition to reducing the cost of the power supply, the cost of associated components may be reduced. For example, a less expensive power bus or power wires may be used, because these components may be designed for a lower power capacity. Also, a smaller and less expensive cooling system may be used, because a smaller power supply dissipating less heat is used. If less heat is dissipated, then the peak cooling capacity of the cooling system is lower. Thus, a less powerful and typically less expensive cooling system may be implemented. For example, a cooling system may require two blowers or a larger blower if the power supply is designed for a maximum power consumption state of the computer system. By using a smaller power supply, a smaller, less expensive blower may be used to cool the computer system.

According to another embodiment, a power provisioning system is utilized to control the amount of power consumed by components in one or more computer systems. In some instances, the computer systems may demand more power than can be generated by the power supply when the power supply is designed for the nominal power consumption of the computer system instead of the maximum power consumption of the computer systems. The power provisioning system is operable to reduce power consumption of the computer systems prior to the power demand of the computer systems exceeding the maximum power output of the power supply. Therefore, the power provisioning system minimizes the possibility of down time caused by insufficient power for the computer systems.

The power provisioning system monitors the power being consumed by components in the computer systems. When the power consumption is greater than a predetermined threshold, the power provisioning system may place one or more components in a lower-power state to reduce the amount of power being consumed by a respective computer system. Also, an entire computer system in a multi-computer system may be shut down to reduce power consumption of the multi-computer system.

The threshold may be based on the maximum amount of power that can be generated by the power supply. For example, the threshold may be a value less than the maximum amount of power that can be generated by the power supply. Therefore, prior to the power supply reaching its maximum power output, power consumption for the computer systems may be reduced to minimize the possibility that sufficient power is not available to maintain functionality of the computer systems.

By basing the threshold on the maximum power that can be generated by the power supply, the computer systems may use a smaller power supply (e.g., a power supply based on nominal power consumption), instead of a power supply designed to support the maximum power state of the computer systems. When a smaller power supply is used, the power provisioning system controls the power consumption of components in the computer systems to prevent the computer systems from requiring more power than may be generated by the smaller power supply.

A second threshold may also be used to place components in a higher-power state. When, the power consumption of the computer system falls below the second threshold, one or more components may be placed in a higher-power state to improve performance. When the power consumption falls below the second threshold, the power provisioning system determines that excess power is available. Accordingly, a component in a lower-power state may be placed in a higher-power state (e.g., increasing the speed of a processor, turning on a computer system previously shut down, etc.) to improve performance of the system. The power provisioning system determines, prior to increasing the power consumption, that placing the component in the higher-power state will not result in the threshold associated with the maximum power output being exceeded.

According to another embodiment, the power provisioning system controls power consumption for computer systems based on a cooling system. Racks are often used to house multiple computer systems. These racks typically employ a cooling system to remove heat dissipated by the computer systems to maintain electrical components of the computer systems within a predetermined, optimal, temperature range.

Conventional cooling systems are designed to remove heat from components as if the components are continually operating at maximum capacity or power levels (i.e., in an operating state where the components are dissipating the maximum amount of heat). The cooling system, according to an embodiment of the invention, may be designed based on nominal heat dissipation rather than maximum heat dissipation of the computer systems, such as described in co-pending and commonly assigned U.S. patent application Ser. No. 10/608,151, entitled, "Cooling System for Computer Systems", hereby incorporated by reference in its entirety. Nominal heat dissipation may be estimated based on the average heat dissipated of the components of the computer systems, or nominal heat dissipation may be a standard deviation of die average heat dissipation. Other statistical techniques may be used to determine nominal heat dissipation, which may be based on actual measurements or estimations of heat dissipation. Alternatively, the nominal heat dissipation may be based on the heat dissipation of a computer system running a typical workload (e.g., the workload the computer system may operate for a majority of its operation time). The workload of a computer system may be known or estimated by historical measurements of workload for the computer system, monitoring workload of existing computer systems or by testing.

Because, the cooling system may be designed based on nominal heat dissipation, there may be some instances when the maximum cooling capacity of the cooling system is not able to meet the cooling demand of the computer systems (e.g., when all the computer systems are operating at maximum capacity and dissipating a maximum amount of heat). A cooling provisioning system minimizes the possibility of damage to components and decreased life expectancy caused by insufficient cooling for a computer system by communicating cooling demand to the power provisioning system. The power provisioning system may place components/computer systems in a lower-power state to reduce heat dissipation if insufficient cooling resources are available. Also, there may be multiple lower-power states for each component. For example, a processor for a computer system may be placed in a lower-power state by reducing clock speed to one of multiple lower clock speeds, whereby each clock speed represents a lower-power state or step. The power provisioning system may instruct the processor to reduce or increase clock speed or power consumption by one or more steps. In addition, workloads for the computer systems may be prioritized based on importance of the applications executing on the computer systems. Therefore, computer systems having a higher priority are selected last for being placed in a lower-power state.

Also, the cooling system may distribute cooling fluid to computer systems based on heat dissipation or workload of the computer systems. Therefore, there may be some instances when excess cooling resources are available, such as when a computer system is consuming less power and dissipating less heat. The cooling system compares a current amount of cooling fluid being provided to cool the computer systems to an excess cooling threshold. If the amount of cooling fluid being used is less than the excess cooling threshold, then the cooling system determines that excess cooling fluid is available. The excess cooling threshold is used to prevent the system from continually switching the state of components when any small amount of excess cooling fluid is available.

The cooling system may report to the power provisioning system that excess cooling resources are available. Then, the power provisioning system may return components or computer systems currently in a lower-power state to a higher-power state, usually with better performance. For example, if the clock speed of a processor was previously reduced, the clock speed may be increased by one step if multiple clock speeds are used, resulting in better performance.

FIG. 1 illustrates a computer system 100, according to an embodiment. The computer system 100 includes components 10 being powered by a power supply 20. The components 10 may include conventional components of a computer system, such as one or more processors, memory (e.g., RAM, ROM, etc.), storage devices (e.g., hard drives, etc.), video cards, user input devices, and the like. The components 10 may vary depending on the type of computer system 100. For example, the computer system 100 may include a "white box" server, a server in a rack system (e.g., a blade), a desktop computer, a laptop computer, a portable computing device (e.g., personal digital assistant, etc.), and the like. Certain components may be used for certain types of computer systems. For example, a server may include multiple central processing units (CPUs), and a personal computer may include one CPU.

The power supply 20 may be integral with the computer system 100 or a separate power system, such as in a rack system, connected to the computer system 100. Like the components 10, the power supply 20 may vary depending on the type of the computer system 100. For example, the power supply 20 may include one or more conventional power supplies (e.g., fuel cells, power supplies connected to an outside source, such as a power utility, and converting the power for use by computer systems, etc.).

The computer system 100 also includes a power monitor 30 connected to the power supply 20 for measuring the power output of the power supply. A provisioning system 40 is connected to the power monitor 30 and the components 10 for placing one or more of the components 10 in a lower-power state to reduce power consumption when necessary. Components in a lower-power state may also be placed in a higher-power state by the provisioning system 40 if sufficient power is available.

The power monitor 30 may include a conventional power measuring circuit for measuring the power output from the power supply 20. The power supply 20 may supply power based on the demand of the components 10. Thus, as the components 10 require more power, the power output of the power supply 20 increases. The power monitor 30 detects the power output by the power supply 20, which may increase/decrease over time. The power monitor 30 may measure the power output of the power supply 20 continuously or periodically. The power monitor 30 measures the power consumption of the components 10. The power monitor 30 is not limited to a power measuring circuit connected to an output of a power supply. Other embodiments of the power monitor 30 may be implemented for determining power consumption of the components 10, such as connecting one or more power measuring circuits to the components 10 to measure power consumption of the computer system 100.

The provisioning system 40 may receive power output measurements from the power monitor 30. Alternatively, the power monitor 30 may output measurements to memory and/or a storage device for retrieval by the provisioning system 40. The provisioning system 40 compares the power consumption of the components 10 (e.g., measured by the power monitor 30) to a threshold to determine whether the power demand from the components 10 is close to exceeding the maximum power output of the power supply 20. If the power consumption exceeds the threshold, then the provisioning system 40 places one or more of the components 10 in a lower-power state. Also, a second threshold may be used to determine when sufficient power is available for placing one or more of the components from a lower-power state to a higher-power state. For example, if the power consumption of the components 10 is below the second threshold, then one of the components 10 may be placed in a higher-power state (e.g., for increasing performance of the computer system 100).

Figure 2:
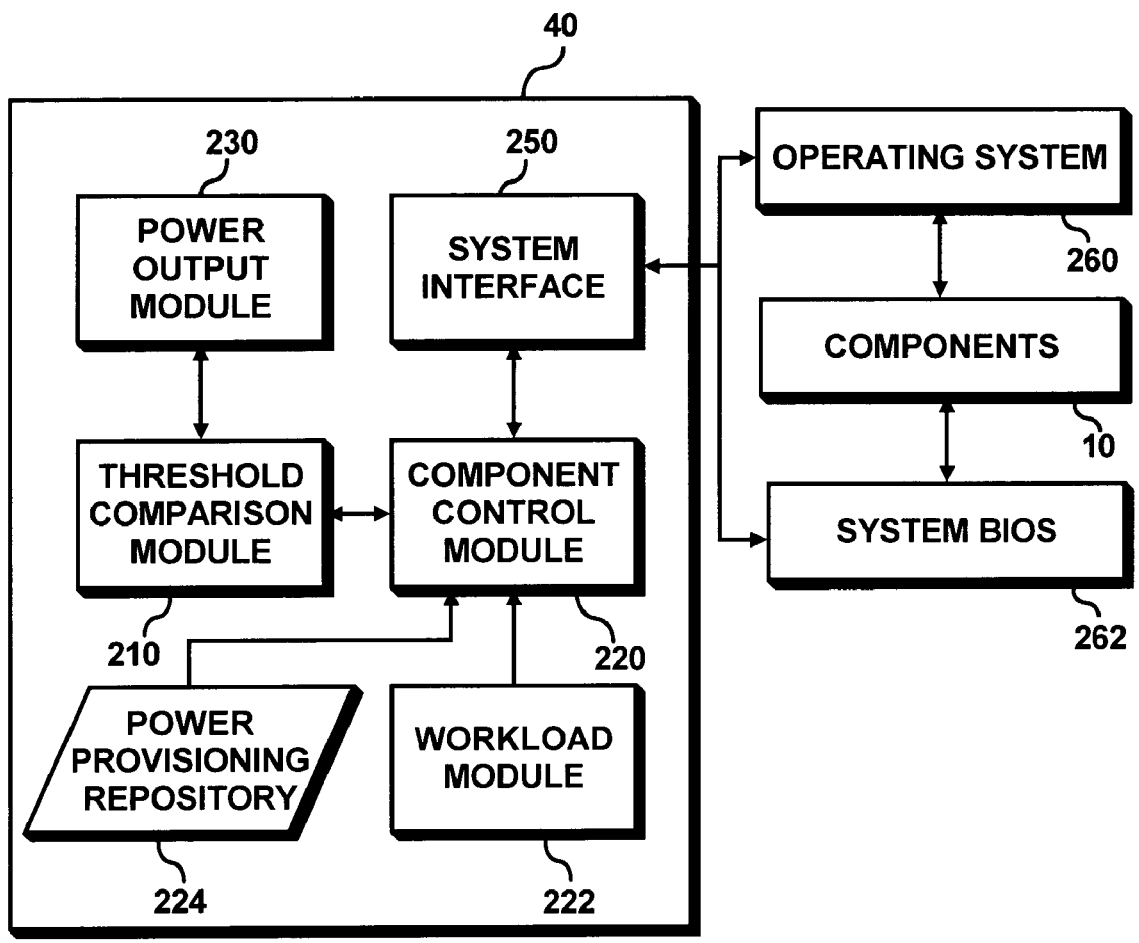
FIG. 2 illustrates a software architecture of a power provisioning system, according to an embodiment of the invention.

The provisioning system 40 may include a software-based, expert system. FIG. 2 illustrates an exemplary software architecture 200 for the provisioning system 40 shown in FIG. 1, according to an embodiment of the invention. It should be readily apparent to those of ordinary skill in the art that the architecture 200 depicted in FIG. 2 represents a generalized schematic illustration and that other components may be added or existing components may be removed or modified. Moreover, the architecture 200 may be implemented using software components, hardware components, or a combination thereof. Also, the modules of the software architecture 200 may be executed by a system controller, such as one or more processors for the computer system 100 shown in FIG. 1.

As shown in FIG. 2, the architecture 200 of the provisioning system 40 may include a power output module 230, a threshold comparison module 210, a component control module 220, a workload module 222, a power provisioning repository 224, and a system interface 250. The power output module 230 determines power consumption of the components 10 of FIG. 1 (e.g., receiving power output measurements taken by the power monitor 30 of FIG. 1). The power monitor 30 measures the power output of the power supply 20 either continuously or periodically. These measurements may be transmitted directly to the provisioning system 40 stored in memory/storage device for retrieval by the power output module 230, or both.

The threshold comparison module 210 compares the measurements with a first predetermined threshold to determine whether the components 10 of the computer system 100 shown in FIG. 1 are close to demanding power that may exceed the maximum power output of the power supply 20. Also, the threshold comparison module 210 compares the measurements with a second predetermined threshold to determine whether the components 10 may be placed in a higher-power state.

Referring to FIG. 1, the power supply 20 may be designed based on the nominal power consumption of the computer system 100 rather than the maximum power consumption of the computer system 100. Therefore, in some instances, the computer system 100 may demand more power that can be generated by the power supply 20.

Referring to FIG. 2, the first threshold used by the threshold comparison module 210 may be based on the maximum amount of power that can be generated by the power supply 20. The first threshold may be a specific amount of power or may be a rate of consumption. For example, the slope of the power consumption of the computer system over time may be compared to a predetermined slope. The first threshold may be a value less than the maximum amount of power that can be generated by the power supply 20. For example, if the maximum power output of the power supply 20 is 500 Watts, the first threshold may be set at 450 Watts to allow sufficient time for the component control module 220 to effectuate a reduction in power consumption by the components 10. Therefore, prior to the power supply 20 reaching its maximum power output, power consumption for the computer system 100 may be reduced to minimize the possibility that sufficient power is not available to maintain functionality of the computer system 100.

It will be apparent to one of ordinary skill in the art that the threshold may be set based on the parameters of the computer system 100. For example, a computer system highly responsive to the component control module 220 may allow the threshold to be set higher (e.g., 480 Watts). Also, the computer system 100 may include less components that demand a significant amount of power. In this instance, the threshold may be set higher, because it is less likely that the power demand of the computer system 100 will abruptly rise in large quantities. These and other parameters may be considered when setting the threshold.

By setting the first threshold based on the maximum power that can be generated by the power supply 20, the computer system 100 may use a smaller power supply, instead of a power supply designed to support the maximum power consumption state of the computer system 100. Using a smaller power supply may result in reduced manufacturing costs for the computer system 100. For example, smaller power bus(es) or a cooling system with a smaller cooling capacity may be used.

Referring to FIG. 2, the threshold comparison module 210 continually or periodically compares the power measurements from the power output module 230 to the first threshold. If the first threshold is exceeded, the threshold comparison module 210 invokes the component control module 220 to place one or more of the components 10 from the computer system 100 shown in FIG. 1 in a lower-power state. For example, the component control module 220 may instruct a processor to lower its processing speed, resulting in the processor consuming less energy. In a multi-processor system, one or more processors may be shut down or lower their clock speed. Processing may be moved to another computer system 100 if available and if necessary to maintain throughput. In addition, multiple lower-power states may be utilized. Therefore, for a processor operable to run at multiple lower clock speeds, the component control module 220 may reduce the processor speed by one or more steps (i.e., one step for each lower clock speed).

Placing a component in a lower-power state may also include temporarily disabling a floating point unit of a processor to reduce power consumption. The floating point unit may be re-activated when the power output falls below the threshold.

In another example, a portion of a cache or a cache may be made inaccessible, or one or more disk drives may be made inaccessible to reduce power consumption. The component control module 220 may instruct a cache controller or a storage device controller (not shown) to select and manage a cache, a portion of a cache, or a storage device to be temporarily not used for reducing power consumption. For example, a controller may identify redundant components that can be temporarily shut down to reduce power consumption. Alternatively, a controller may move data to enable a temporary shut down of a storage device or a cache without affecting throughput. These and other known power-saving techniques may be used to reduce power consumption in the computer system 100.

The power provisioning repository 224 stores power-state information for the components 10, and the power-state information may be used by the component control module 220 for selecting components to be placed in a lower-power or higher-power state. The component control module 220 stores the power state of the components 10 in the repository 224. The repository 224 may store a list of components 10, the power state of each of the components 10, and optionally the power consumption of each of the components 10 in their current power state. For the components 10 that may be placed in multiple lower-power states, the repository 224 may identify which of the lower-power states the components 10 are in and the number of lower-power states, the power consumption range of the components 10, or the overall power consumption of the computer system 100 for each of the system states represented by placing the components 10 in any of their power states. For a processor in a lower-power state, for example, the repository 224 may identify the reduced clock speed and further identify the speeds to which the clock may be further reduced or increased and possibly the corresponding power consumption. The repository 224 may also identify the current power consumption of the processor. The repository 224 may include data on the components 10 in a lower-power state or data on substantially all the components 10. Also, the repository 224 may store application priority information, such as described below, to identify which components 10 are associated with high-priority applications. The components 10 associated with high-priority applications may lastly be placed in a lower-power state by the component control module 220.

The workload module 222 is also connected to the component control module 220. The workload module 222 may transmit information to the component control module 220 for prioritizing components to be placed in a lower-power or higher-power state. For example, the components 10 may include multiple processors executing multiple applications of varying importance, such as may be identified by a system administrator and the like. The workload module 222 transmits information to the component control module 220 related to the importance of each application, and the component control module 220 may lastly place processors executing applications of higher importance in a lower-power state.

In addition to placing the components 10 in a lower-power state, the component control module 220 may place one or more of the components 10 in a higher-power state. For example, the threshold comparison module 210 may compare the power consumption of the components 10 to a second threshold. The second threshold may be based on averaging or other trend-discovery algorithms applied to the current power load so as to avoid reacting to instantaneous changes in the power. The second threshold may, for example, be a predetermined amount below the nominal power consumption of the computer systems 100. The second threshold may further be determined by selecting a value that is sufficiently low that at least one of the components 10 can be placed in a higher-power state without causing the maximum threshold (i.e., the first threshold) to be immediately exceeded.

If the power consumption falls below the second threshold, then one or more of the components 10 may be placed in a higher-power state. In one embodiment, components 10 associated with high-priority applications are generally the first to be placed in a higher-power state. This may include components 10 already in a lower-power state. For example, a processor may increase its clock-speed to improve performance if sufficient power is available.

The component control module 220 may communicate with an operating system 260 or a system BIOS 262 to control the components 10 (e.g., to place one or more of the components 10 in a lower-power state or to return one or more of the components 10 to a higher-power state). The component control module 220 may communicate with the operating system 260 through the system interface 250. The system interface 250 may be implemented as an application program interface, a function call or other similar interfacing technique. Although the system interface 250 is shown to be incorporated within the provisioning system 40, it should be readily apparent to those skilled in the art that the system interface 250 may also be incorporated elsewhere within the architecture of the computer system 100.

The operating system 260 may be configured to manage the software applications, data and the components 10 of the computer system 100. The operating system 260 may be implemented by the MICROSOFT WINDOWS family of operating systems, UNIX, HEWLETT-PACKARD HP-UX, LINUX, RIM OS, and other similar operating systems. The operating system 260 may be further configured to couple with the components 10 via device drivers (not shown), interrupts, etc. Also, the processor and other components of the computer system 100 may be controlled via the system BIOS 262.

The modules 210-230 may be implemented as software programs, utilities, subroutines, or other similar programming entities. In this respect, the modules 210-230 may be implemented using software languages such as C, C++, JAVA, etc. Alternatively, the modules 210-230 may be implemented as an electronic device utilizing an application specific integrated circuit, discrete components, solid-state components or a combination thereof.

Figure 3:
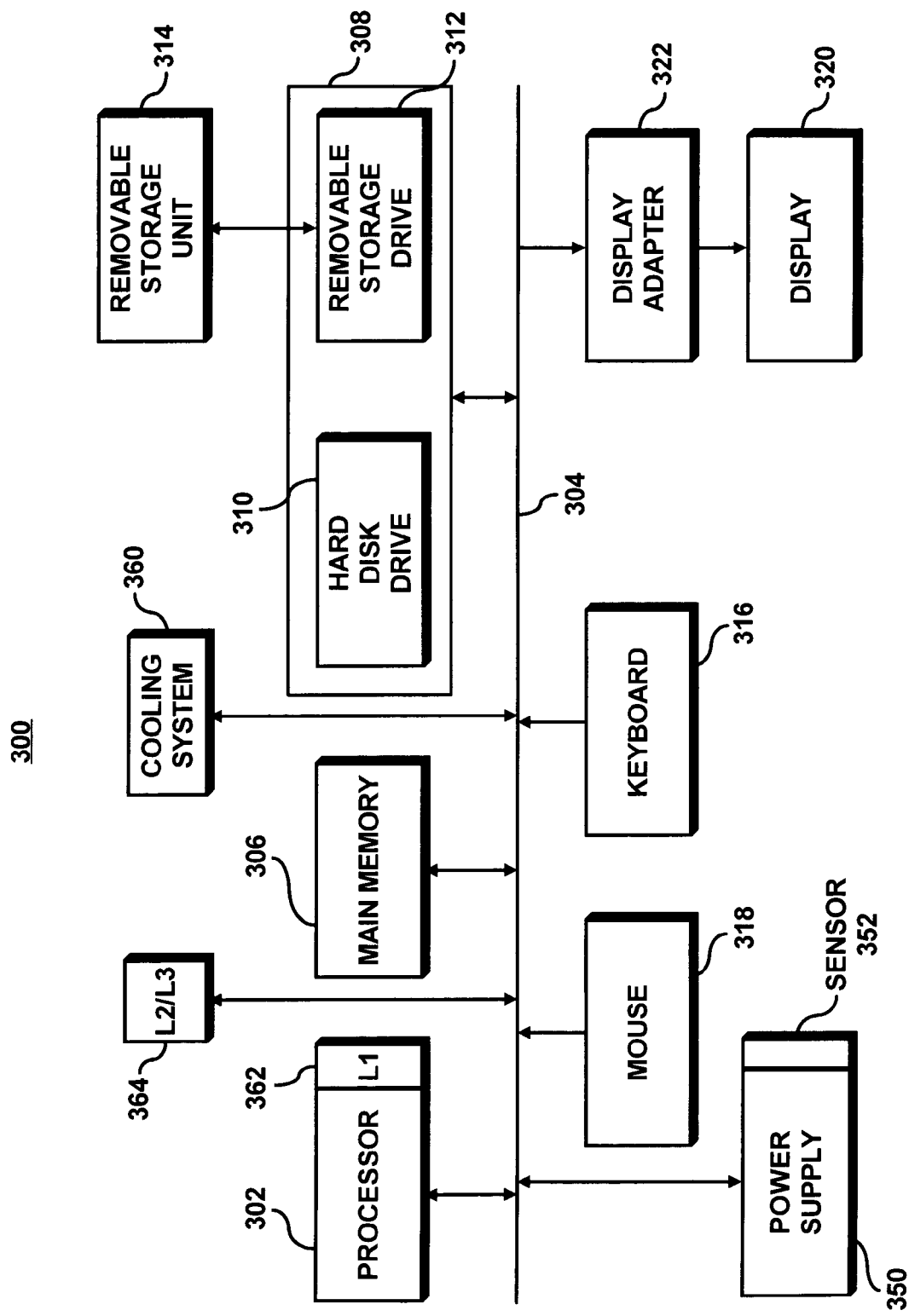
FIG. 3 illustrates a more detailed block diagram of a computer system, according to an embodiment of the invention.

FIG. 3 is a schematic block diagram of a computer system 300 powered by one power source, according to an embodiment of the invention. The functions of a provisioning system (e.g., the provisioning system 40 shown in FIGS. 1 and 2) may be implemented in program code and executed by the computer system 300. Modules in the computer system 300 may be implemented in known computer languages.

As shown in FIG. 3, the computer system 300 includes one or more processors, such as processor 302, providing an execution platform for embodiments of the modules (e.g., the modules 210-230 of the provisioning system 40 shown in FIG. 2) executed by the computer system 300. Commands and data from the processor 302 are communicated over a communication bus 304. The computer system 300 also includes a main memory 306, such as a random access memory (RAM) for storing program code during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for the provisioning system may be stored. The removable storage drive 310 reads from and/or writes to a removable storage unit 314 in a well-known manner. User input and output devices may include a keyboard 316, a mouse 318, and a display 320. The display adaptor 322 interfaces with the communication bus 304 and the display 320 and receives display data from the processor 302 and converts the display data into display commands for the display 320.

A power source, such as a power supply 350, generates power for the computer system 300. A sensor 352 may be connected to the power supply 350 or a power bus (not shown) to measure the power consumption of the components of the computer system 300. The sensor 352 may be connected to other components (e.g., main memory 306, processor 302, storage 308, etc.) via the data bus 304.

The power supply 300 may be a power source that is functional to provide power based on a nominal power consumption of the computer system 300 rather than a maximum power consumption of the computer system 300 or a provisioned computer system 300.

In one embodiment, the processor may receive power output data from the sensor 352. The processor 302 compares the data to at least first and second thresholds. If the first threshold is exceeded, the processor 302 may place one or more of the components of the computer system 300 in a low-power state until the power consumption of the computer system 300 falls below the threshold. For example, the processor 302 may lower its clock speed by one or more steps. The processor 302 may shut down one or more of the hard disks 310 if more than one is available. If a storage device controller is used, the processor 302 may instruct the storage device controller to shut down one or more of the hard disks 310.

The computer system 310 may include a multilevel cache (e.g., L1 cache 362, L2 cache and/or L3 cache 364). The processor 302 may shut down one or more of the caches (e.g., the L2 cache and/or the L3 cache 364) for reducing power consumption. The processor 302 may, instead, instruct a cache controller (not shown) not to use a cache or a portion of a cache for reducing power consumption. Also, the processor 302 may disable a floating point unit for the processor 302 if it is not being used by application(s) executing on the computer system 300. These and other known power saving techniques may be employed to reduce power consumption in the computer system 300.

The computer system 300 may include a cooling system 360 for maintaining the components of the computer system 300 within a predetermined operating temperature range. The cooling system 360 may include an air-cooled system, liquid-cooled system, etc. The cooling system 360, as well as other components of the computer system 300, may be selected for use in the computer system 300 based on the power source selected. For example, a less expensive cooling system 360 may be used if the power supply 350 is designed to output power based on nominal power consumption rather than maximum power consumption for the computer system 300, because the power supply 350 may dissipate a less amount of heat. It will be apparent to one of ordinary skill in the art that other components not shown may be included in the computer system 300. The cooling system 360 may also determine when excess cooling fluid (e.g., air, refrigerant, etc.) is available, such as when the computer system 300 is dissipating less than a nominal amount of heat. If excess cooling fluid is available the cooling system 360 may report to the processor 302 that excess cooling fluid is available. Then, the processor may increase the power consumption of one or more components in a lower-power state. Also, rather than being based on the cooling system, the power consumption may be compared to a second threshold for determining whether one or more of the components may be placed in a higher-power state.

Figure 4:
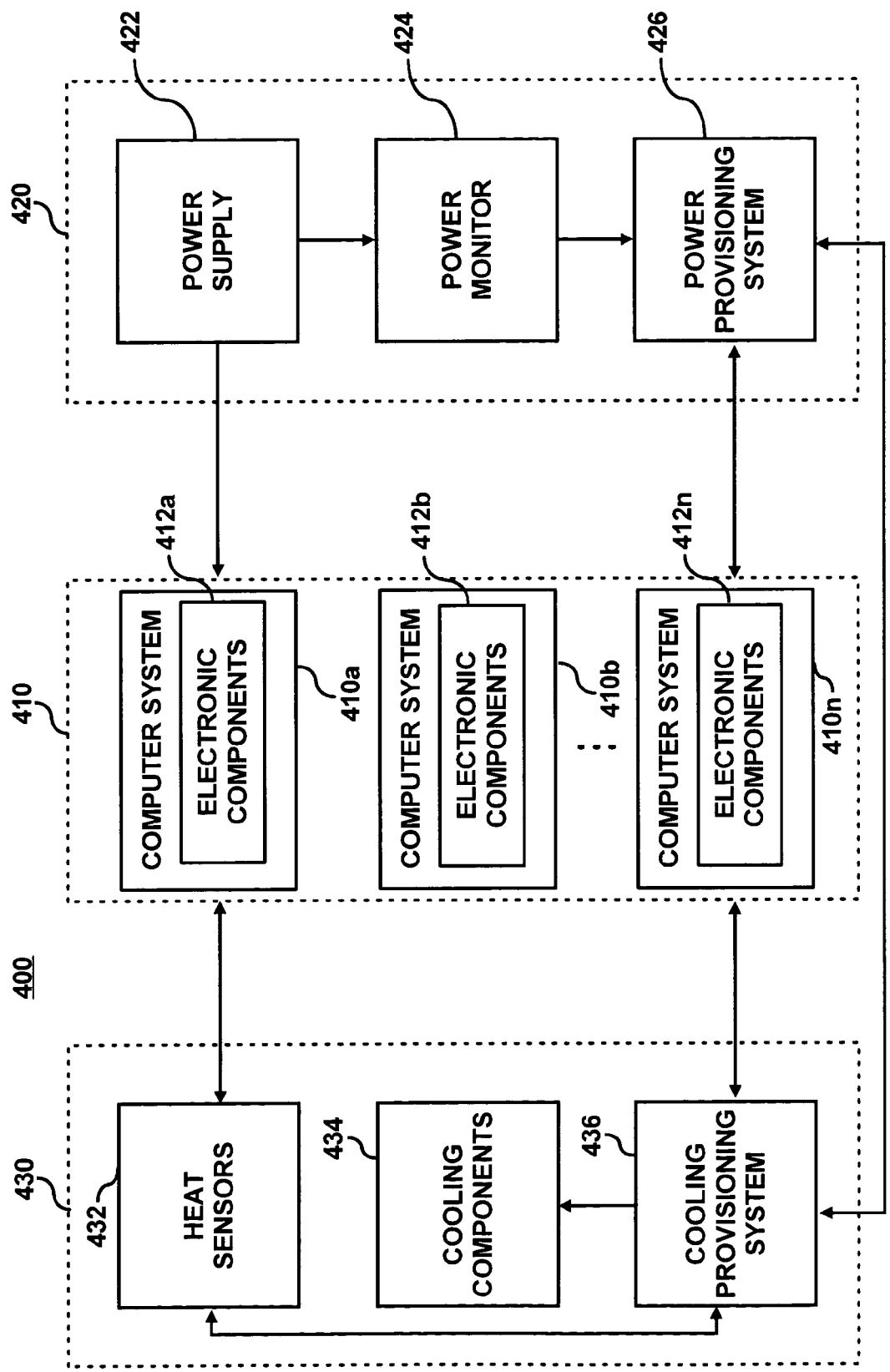
FIG. 4 illustrates a block diagram of a multi-computer system employing a power system and a cooling system, according to an embodiment of the invention.

FIG. 1 illustrates a block diagram of a computer system 100 employing a power provisioning system 40. The computer system 100 is generally related to a single computer system. FIG. 4 illustrates a block diagram of a multi-computer system 400 employing a power system 420 and a cooling system 430, according to an embodiment of the invention. The multi-computer system 400 may be housed in a rack (shown in FIGS. 6 and 7) or other enclosure (e.g., cabinet, data center, etc.) to help facilitate cooling and power provisioning.

The system 400 includes computer systems 410 (e.g., computer systems 410a . . . n having electronic components 412a . . . n), a power system 420 generating power for the computer systems 410, and a cooling system 430 removing heat dissipated by the electronic components 412a . . . n for the computer systems 410. The components 412a . . . n may include conventional components of a computer system, such as one or more processors, memory (e.g., RAM, ROM, etc.), storage devices (e.g., hard drives, etc.), video cards, user input devices, and the like. The components 412a . . . n may vary depending on the type of computer system implemented. For example, the computer systems 410 may include a "white box" server, a server in a rack system (e.g., one or more server blades housed in an enclosure and mounted in a rack), system boards (e.g., input/output (I/O) boards, memory boards, etc.), and the like.

The power system 420 includes one or more power supplies 422, a power monitor 424, and a power provisioning system 426. The power supply 422 generates power for the computer systems 410, the cooling system 430, and the power system 420. The power monitor 424 is connected to the power supply 422 for monitoring the power output of the power supply 422. The power monitor 424 may include a conventional power measuring circuit for measuring the power output of the power supply 422. In another embodiment, the power monitor 424 may include one or more power measuring circuits connected to sections of a power bus, such as the power bus 650 shown in FIG. 6, providing power to the computer systems 410. The power monitor 424 measures the power consumption of the computer systems 410 using the one or more power measuring circuits connected to the power bus.

The power provisioning system 426 is connected to the power monitor 424, the computer systems 410, and a cooling provisioning system 436. The power provisioning system 426 may place one or more of the components 412a . . . n in a lower-power state in response to the power supply 422 and/or the cooling system 430 nearing full capacity. The power supply 422 may be designed based on the nominal power consumption of the computer systems 410 rather than the maximum power consumption of the computer systems 410. Therefore, in some instances, the computer systems 410 may demand more power than can be generated by the power supply 422. The power provisioning system 426 compares the power consumption of the computer systems 110 (e.g., measured by the power monitor 424) to a threshold based on the maximum amount of power that can be generated by the power supply 422. The threshold may be a value less than the maximum amount of power that can be generated by the power supply 422 to allow sufficient time for the component control module 220 to effectuate a reduction in power consumption by the components 412a . . . n. If the threshold is exceeded, the power provisioning system 426 may place one or more of the components 412a . . . n in a lower-power state. A second threshold is also used for placing one or more of the components 412a . . . n in a higher-power state if sufficient power and/or cooling resources are available. The second threshold is described in detail below with respect to a threshold comparison module 510, shown in FIG. 5. Generally, if the power consumption of the components 412a . . . n falls below the second threshold, excess power may be available for allowing one or more the components 412a . . . n to consume more power. This may include placing a component in a higher-power state to improve performance (e.g., increasing the speed of a processor, enabling one or more caches currently shut down, etc.).

The power provisioning system 426 may place the components 412a . . . n in multiple lower-power states. For example, a processor for the computer system 410a may be placed in a lower-power state by reducing clock speed to one of multiple lower clock speeds, whereby each clock speed represents a lower-power state or step. In another embodiment, the power provisioning system 426 may instruct a computer system or processor to reduce its power consumption to a particular amount. For example, a processor may include power management software for controlling its power consumption to be within a predetermined range. The power provisioning system 426 may instruct the processor to limit its power consumption to not exceed a value within the range. If the range, for example, is 5-10 Watts (W), then the power provisioning system 426 may instruct the processor not to exceed 6W. Likewise, when placing components in a higher-power state, the power provisioning system 426 may instruct the processor not to exceed, for example, 8W.

In addition to reducing the clock speed, a computer system may reduce power consumption by controlling other components. For example, one or more of the hard disks, one or more of the caches, or a floating point unit may limit their operation or may be shut down. These and other known power saving techniques may be employed to reduce power consumption.

The power provisioning system 426 may also prioritize workloads for the computer systems 410 based on importance of the applications executing on the computer systems 410. Therefore, computer systems 410 having a higher priority are selected last for being placed in lower-power states.

The power provisioning system 426 is also connected to the cooling system 430, and more specifically to a cooling provisioning system 436. The power provisioning system 426 may place one or more components 412a . . . n in a lower-power state to reduce heat dissipation if insufficient cooling resources are available to sufficiently remove heat being dissipated by the computer systems 410. The power provisioning system 426 may receive a message from the cooling provisioning system 436 reporting that sufficient cooling resources are not available. Then, the power provisioning system 426 may place one or more components 412a . . . n in a lower-power state to reduce heat dissipation of the computer systems 410, such that sufficient cooling resources are available to remove the heat being dissipated after one or more of the components 412a . . . n are placed in a lower-power state.

In addition, the cooling provisioning system 436 may identify specific computer systems or components of the computer systems 410 that can be less efficiently cooled. The power provisioning system 426 may place these computer systems or components in a lower-power state before other computer systems or components. For example, the computer system 410a may be located in an area that tends to be hotter than an area where the computer system 410b is located, or it may be more difficult to distribute cooling fluid to the location where the computer system 410a resides. Therefore, the power provisioning system 426 may be more apt to place the components 412a in a lower-power state, because it takes more energy to cool the components 412a. Therefore, in one embodiment, the power provisioning system 426 may take cooling efficiency into consideration when determining which component to place in a lower-power state.

The power system 420 and the cooling system 430 may be designed based on nominal power consumption and nominal heat dissipation, respectively. Then, when power consumption for the computer systems 410 is reduced in response to the power consumption exceeding the threshold, heat dissipation for the computer systems 410 is also reduced. Therefore, in many instances, reducing heat dissipation in response to detecting excessive power consumption allows the cooling system 430 to have sufficient resources to cool the computer systems 410. However, if the power system 420 and the cooling system 430 are not proportionally designed, then a reduction in available cooling resources may not necessarily be proportionally indicative of an increase in power consumption and vice versa. In these instances, cooling resources and power consumption should be measured to accurately determine whether a desired amount of cooling resources and power is available.

The cooling system 430 is also operable to dynamically distribute cooling fluid to the computer systems 410 based on heat dissipation. The cooling provisioning system 436 controls the cooling components 434 to distribute cooling fluid to each of the computer systems 410 based on the amount of heat dissipated by each of the respective computer systems 410, which is measured by the heat sensors 430. The cooling components 434 may include fans, blowers, louvers, pumps, valves, etc. for distributing cooling fluid in an enclosure, such as a rack. As described above, U.S. patent application Ser. No. 10/608,151, which was incorporated by reference above in its entirety, discloses a cooling system designed based on nominal heat dissipation and operable to dynamically distribute cooling fluid.

As described above, the cooling system 430 includes a cooling provisioning system 436. The cooling system 430 also includes heat sensors 432 for measuring the heat dissipated by the computer systems 410 and cooling components 434 for distributing cooling fluid (e.g., air, refrigerant, etc.) to the computer systems 410 and the power system 420, such as the power supply 422 (which may include several power supplies providing power for the computer systems 410. The cooling system 430 comprises a cooling a system designed based on the nominal heat dissipation of the computer systems 410, rather than based on the maximum heat dissipation of the computer systems 410, which minimizes power consumption and costs. The nominal heat dissipation is less than the maximum heat dissipation. The nominal heat dissipation may be estimated based on the average heat dissipated of the components 412a . . . n of the computer systems 410, or nominal heat dissipation may be a standard deviation of the average heat dissipation. Other statistical techniques may be used to determine nominal heat dissipation, which may be based on actual measurements or estimations of heat dissipation. Alternatively, the nominal heat dissipation may be based on the heat dissipation of the computer systems 410 running a typical workload (e.g., the workload the computer systems 410 may operate for a majority of the operation time). The workload of a computer system may be known or estimated by historical measurements of workload for the computer system, monitoring workload of existing computer systems or by testing.

The cooling system 430 is also operable to dynamically distribute cooling fluid to the computer systems 410 based on heat dissipation. The cooling provisioning system 436 controls the cooling components 434 to distribute cooling fluid to each of the computer systems 410 based on the amount of heat dissipated by each of the respective computer systems 410, which is measured by the heat sensors 430. The cooling components 434 may include fans, blowers, louvers, pumps, valves, etc. for distributing cooling fluid in an enclosure, such as a rack. As described above, U.S. patent application Ser. No. 10/608,151, which was incorporated by reference above in its entirety, discloses a cooling system designed based on nominal heat dissipation and operable to dynamically distribute cooling fluid.

Figure 5:
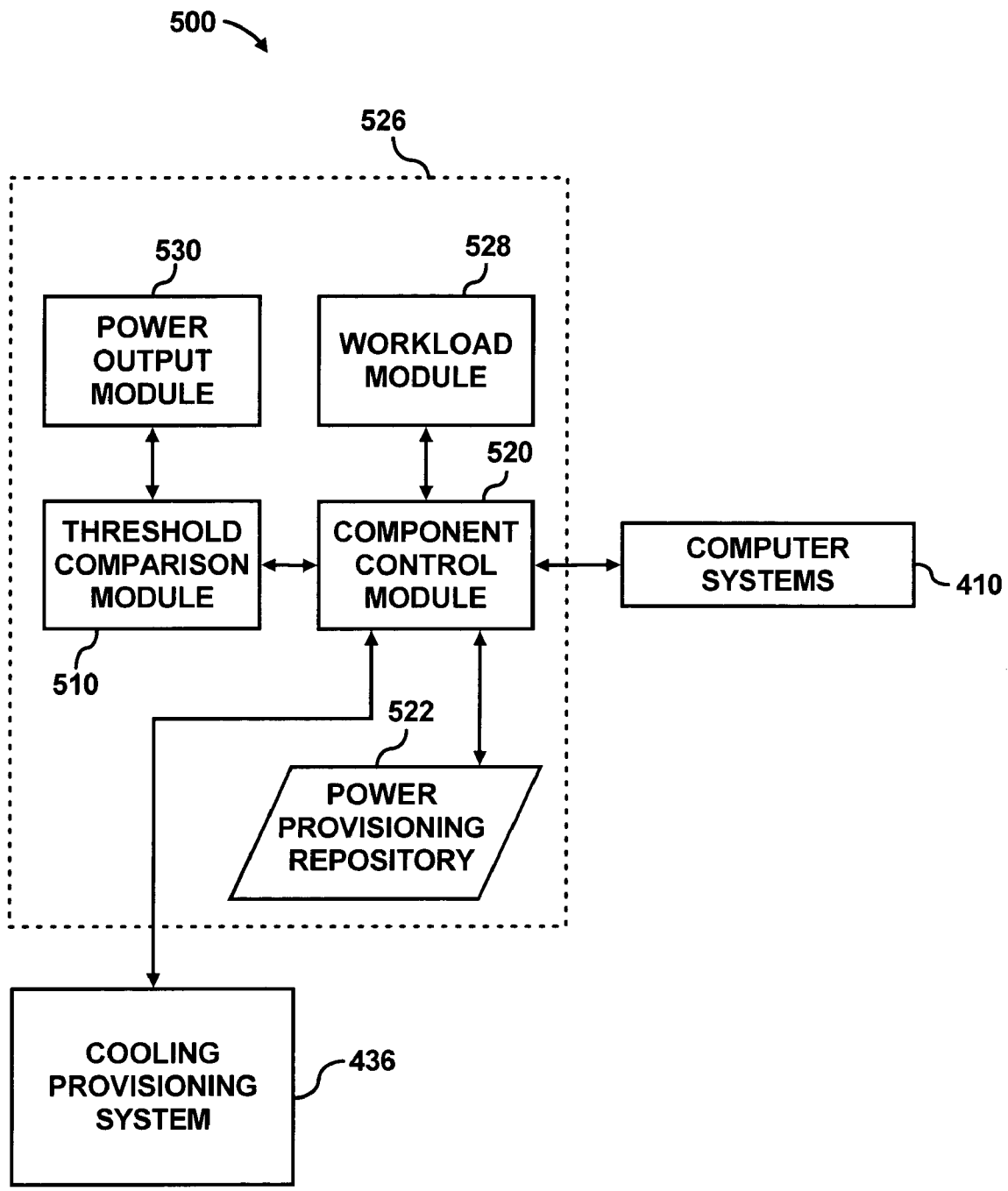
FIG. 5 illustrates a software architecture of a power provisioning system, according to an embodiment of the invention.

FIG. 5 illustrates an exemplary software architecture 500 for the power provisioning system 426 shown in FIG. 4, according to an embodiment of the invention. It should be readily apparent to those of ordinary skill in the art that the architecture 500 depicted in FIG. 5 represents a generalized schematic illustration and that other modules may be added or existing modules may be removed or modified. Moreover, the architecture 500 may be implemented using software components, hardware components, or a combination thereof. Also, the modules of the software architecture 500 may be executed by a system controller, such as one or more processors.

As shown in FIG. 5, the architecture 500 of the power provisioning system 426 may include a power output module 530, a threshold comparison module 510, a component control module 520, and a workload module 528. The power output module 530 receives power output measurements taken by the power monitor 424 of FIG. 4. The power monitor 424 measures the power output of the power supply 422 either continuously or periodically. Alternatively, the power monitor 424 measures the power consumption of the computer systems 110 using power measuring circuits connected to a power bus. These measurements may be transmitted directly to the power provisioning system 426 or stored in memory/storage device for retrieval by the power output module 530.

The threshold comparison module 510 compares the power output measurements with a predetermined threshold to determine whether the computer systems 410 are close to demanding power that may exceed the maximum power output of the power supply 422. If the threshold is exceeded, the threshold comparison module 510 invokes the component control module 520 to place one or more of the components 412$a$ . . . $n$ of the computer systems 410 in a lower-power state. For example, the component control module 520 may instruct a processor to lower its processing speed. For a processor operable to run at multiple lower clock speeds, the component control module 520 may reduce the processor speed by one or more steps (i.e., one step for each lower clock speed). For processors utilizing power management software, the component control module 520 may instruct the processor to reduce its power consumption to a particular range or value.

The threshold comparison module 510 also compares the power output measurements from the power monitor 424 to a second threshold to determine whether excess power is available. The comparison to the second threshold may be performed after applying averaging or other trend-discovery algorithms to the measured power consumption so as to avoid reacting to instantaneous changes in the power (i.e., to avoid situations whereby the power state of components is constantly be changed). The second threshold may, for example, be a predetermined amount below the nominal power consumption of the computer systems 410. The second threshold may further be determined by selecting a value that is sufficiently low that at least one component can be placed in a higher-power state without causing the maximum threshold to be immediately exceeded.

If the power consumption of the computer systems 410 is below the second threshold, then the power provisioning system may place one or more of the components 412$a$ . . . $n$, currently in a lower-power state, in a higher-power state. When doing so, the power provisioning system 426 may select those components whose predicted power consumption in the higher-power states will not result in the maximum threshold being surpassed. Further, whenever a component is placed in a higher-power state, the power provisioning system 426 may invoke the higher-power states in a gradual manner should the predicted power consumption of any state cause the overall power consumption to exceed the nominal power rating of the power supply 422.

The component control module 520 stores the power state of the components 412$a$ . . . $n$ in a power provisioning repository 522. The repository 522 may store a list of components 412$a$ . . . $n$, the power state of each component, and optionally the power consumption of each of the components in their current power state. For the components 412$a$ . . . $n$ that may be placed in multiple lower-power states, the repository 522 may identify which of the lower-power states the components are in and the number of lower-power states, the power consumption range of the components, or the overall power consumption of the computer system 400 for each of the system states represented by placing the components 412$a$ . . . $n$ in any of their power states. For a processor in a lower-power state, for example, the repository 522 may identify the reduced clock speed and further identify the speeds to which the clock may be further reduced or increased and possibly the corresponding power consumption. The repository 522 may also identify the current power consumption of the processor. The repository 522 may include data on the components 412$a$ . . . $n$ in a lower-power state or the repository 522 may contain data on substantially all the components 412$a$ . . . $n$. Also, the repository 522 may store application priority information, such as described below, to identify which components are associated with computer systems executing high-priority applications. The components 412$a$ . . . $n$ associated with computer systems executing high-priority applications may be lastly placed in a lower-power state by the threshold comparison module 520.

The component control module 520 refers to the repository 522 to select a component to place in a lower-power state or to change the lower-power state (e.g., increase the power consumption or decrease the power consumption) of a component already in a lower-power state. Additionally, if power consumption data is available in the repository 522, the threshold comparison module 520 may refer to the current power consumption of the component to be placed in a lower-power state to determine whether placing the component in a lower-power state will result in a sufficient reduction in power consumption and/or heat dissipation.

The workload module 528 prioritizes applications running on the computer systems 410. For example, an application running on the computer system 410$a$ may have a higher priority than an application running on the computer system 410$b$. The workload module 528 makes application priority information available to the component control module 520. The component control module 520 may select components of computer systems 410 executing application with a high priority last for placing in a lower-power state. For example, the components 412$b$ of the computer system 410$b$ are placed in a lower-power state prior to the components 412$a$ of the computer system 410$a$ executing applications having a higher priority. A system administrator may input application priority information. For example, the workload module 528 may be invoked to request priority information from the system administrator. The application priority information may be transmitted to the component control module 528 upon request. Also, the application priority information may be stored in the repository 522.

The component control module 520 is also connected to the cooling provisioning system 436. The cooling provisioning system 436 determines whether a sufficient amount of cooling resources are available to cool the computer systems 410. If an insufficient amount of cooling resources are available, the cooling provisioning system 436 requests the component control module 520 to place one or more components of the computer systems 410 in a lower-power state. If a predetermined amount of excess cooling resources are available, the cooling provisioning system 436 transmits a message to the component control module 520 indicating that excess cooling resources are available. The component control module 520 may then place one or more components in a higher-power state. For example, the component control module 520 may identify components in a lower-power state from the repository 522 that are associated with one the computer systems 410 having a high priority. These components, for example, are placed in a higher-power state.

Figure 6:
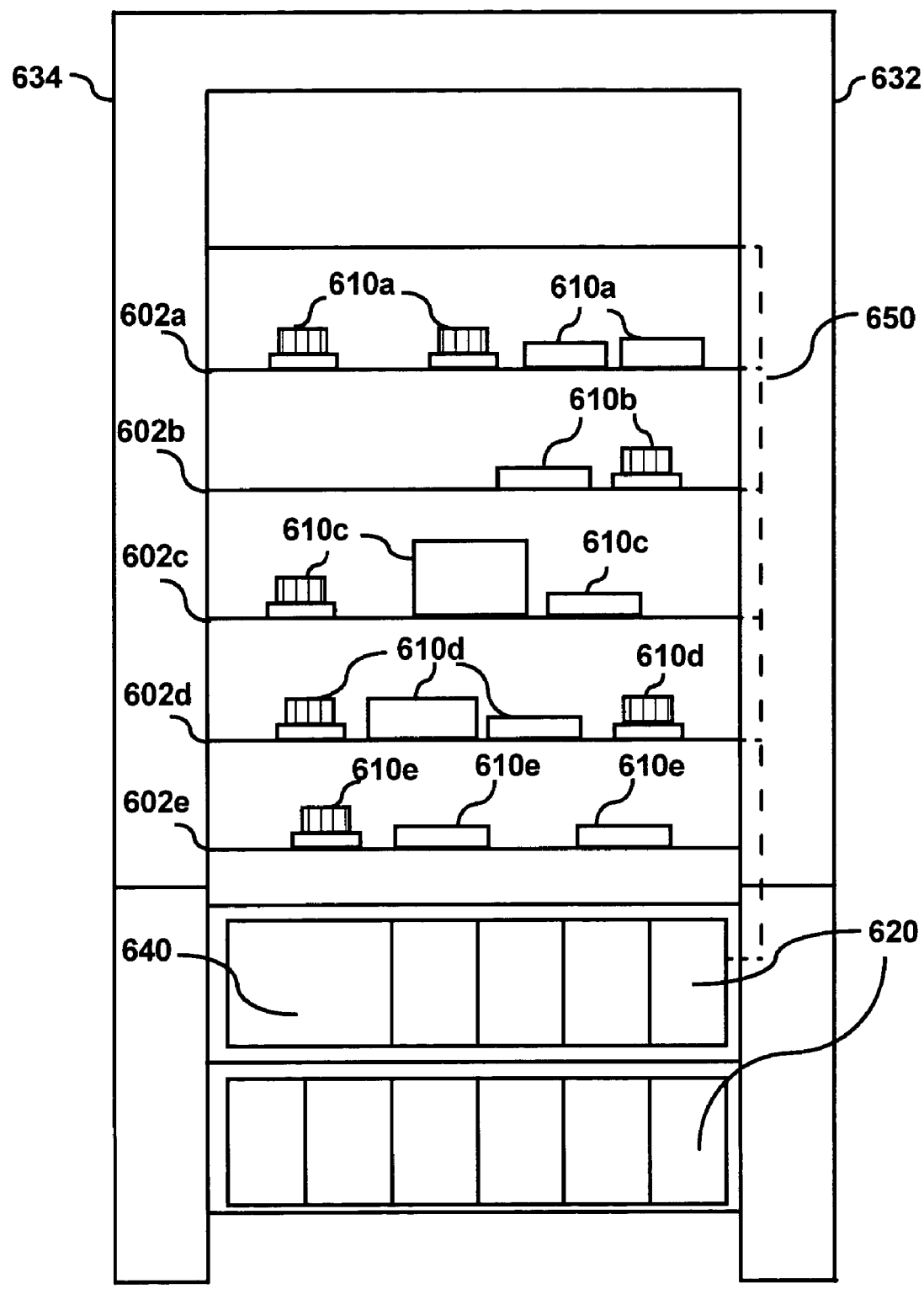
FIG. 6 illustrates a multi-computer system housed in a rack, according to an embodiment of the invention.

FIG. 6 illustrates a rack 600 housing computer systems 602*a-d*, according to an embodiment of the invention. FIG. 6 illustrates a cross-section of the rack 600 having a front 634 and a back 632. Although FIG. 6 shows five computer systems, it will be apparent that different styles of racks housing different number of computer systems may be used.

A power provisioning system 640 controls power consumption of the computer systems 602*a-d*. The computer systems 602*a-e* may include components 610*a-e*. The computer systems 602*a-e* may include servers, storage devices, etc., such as known in the art, and the types of components 610*a-e* may vary depending on the type of computer system.

The rack 600 may house one or more power supplies 620 for generating power for the computer systems 602*a-e* and possibly a cooling system (not shown). According to an embodiment, the number of computer systems powered by the power supplie(s) 620 may be based on a nominal power consumption of the computer systems 602*a-e* rather than a maximum power consumption of the computer systems.

The power provisioning system 640 monitors the power output of the power supplie(s) 620 and compares the power output to a threshold. If the power output exceeds the threshold, the provisioning system 640 may place one or more of the computer systems 602*a-e* in a lower-power state. This may include placing one or more of the components 610*a-e* in a lower-power state, such as described above. This may also include removing power from one of the computer systems 602*a-e* entirely. If one of the computer systems 602*a-e* is taken offline by the provisioning system 640, another one of the computer systems 602*a-e* may perform the computing functions of the computer system taken offline.

The computer systems 602*a-e* may be connected to a power bus 650, which distributes power generated from the power supplie(s) 620. According to an embodiment, the provisioning system 640, for example, may remove power from one of the computer systems 602*a-e* by disabling a section of the power bus 650. Power may be removed from a portion of the power bus, using a switch (not shown) controlled by the provisioning system 640. When the provisioning system threshold is exceeded, the provisioning system may open the switch to open circuit a portion of the bus 650. Also, the power provisioning system 640 may instruct one of the computer systems 602*a-e* to shut down instead of disconnecting a section of the power bus 650.

Figure 7:
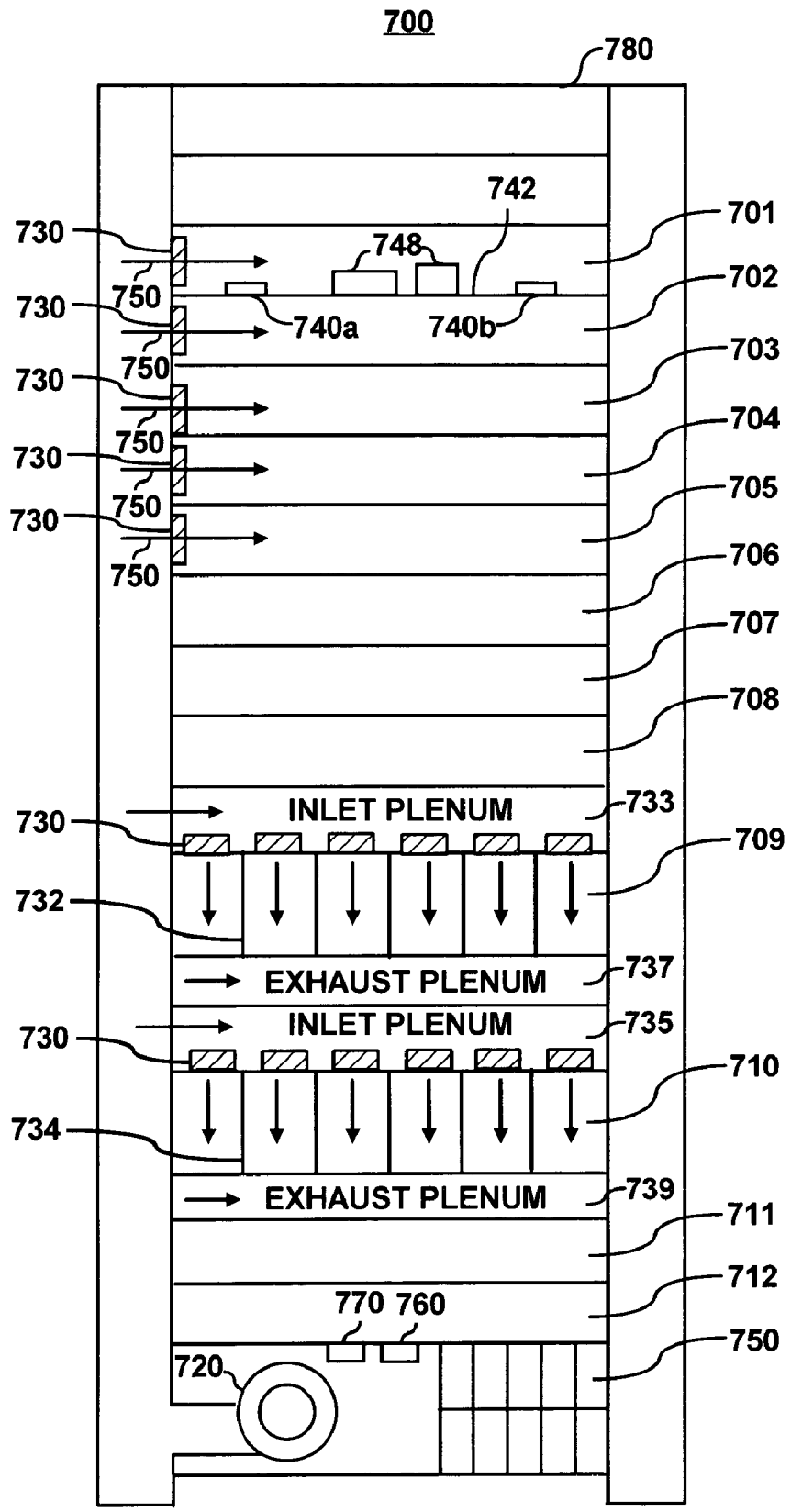
FIG. 7 illustrates another multi-computer system housed in a rack, according to an embodiment of the invention.

FIG. 7 illustrates another embodiment of a rack 700 housing multiple computer systems. In this embodiment, a cooling system, including a cooling provisioning system 770, is shown for cooling the computer systems housed in the rack 700. A power system, including a power provisioning system 760, is also shown for controlling the power consumption of the computer systems.

In this embodiment, a blower and/or fans may be used to cool each computer system in the rack 700. FIG. 7 illustrates a cross section of a rack system 700. The rack system 700 includes an enclosure 780 with slots (also referred to as shelves or bays) 701-712. Twelve slots are shown for illustrative purposes, however, the rack system 700 may be capable of storing up to forty or more computer systems.

Each of the slots 701-712 may support one or more computer systems. For example, a computer system, such as a system board or a box server may be located in a slot, or multiple computer systems, such as multiple blade servers, may be located in a slot. A computer system 742 comprising a system board with components 748 and temperature sensors 740*a* and 740*b* is shown as being mounted in slot 701. Blade servers 732 and 734 are shown as mounted in the slots 709-710. Although not shown for each slot, one or more computer systems may be mounted in each of the slots 701-712.

The cooling system components for the rack system 700 include at least one blower 720 and fans 730. The blower 720 may receive cool air from below the enclosure 780 and distribute the cool air to the slots 701-712 using the fans 730. The arrows 750 show the direction of travel of the cool air across the slots 701-705. The cool air is heated by the heat dissipated from the components of the computer systems mounted in the slots 701-712, and the heated air exits, for example, the rear of the rack system 700. It will be apparent to one of ordinary skill in the art that the fans 730 and the blower 720 may be positioned at other locations in the enclosure 712. Furthermore, the cooling system may be designed such that the heated air exits the rack system 700 from locations other than the rear (e.g., the top, side, bottom, etc.). Although not shown, fans 730 may be used for each of the slots 701-712. Also, instead of or in addition to the fans 730, louvers may be used to control air flow to the slots 701-712. The louvers may be incrementally opened or closed to increase or decrease airflow through the slots 701-712.

Temperature sensors 740*a* and 740*b* are shown for measuring the heat dissipation of the computer system 742. The temperature sensors 740*a* and 740*b* are respectively placed near an air inlet and an air outlet for the computer system 742. The difference between the temperature sensed by sensors 740*a* and 740*b* is a measure of the heat dissipated by the computer system 742. In other embodiments, temperature sensors may be placed in different locations (e.g., in proximity to heat generating components) to determine heat dissipation. Also, temperature sensors for any computer system mounted in the slots 701-712 may be placed in proximity to the air inlets and the air outlets, such that heat dissipation for each computer system mounted in the enclosure 712 may be determined.

For the blades 732 and 734 mounted in slots 709 and 710, fans 730 direct air from inlet plenums 733 and 735 across the blades 732 and 734 to the exhaust plenums 737 and 739 (as illustrated by the arrows). Temperature sensors may be placed at the inlets of the inlet plenums 733 and 735 and the outlets of the exhaust plenums 737 and 739. Instead temperature sensors may be placed at the air inlets and outlets for each blade, such as near a fan 730 and near an outlet in the exhaust plenum.

The cooling provisioning system 770 controls the distribution of cooling fluid (in this case air) to the slots 701-712 based on heat dissipation of each computer system mounted in the slots 701-712. The cooling provisioning system 770 and the power provisioning system 760 may include one or more controllers, ASICs, memory, and/or other circuits operable to perform the functions described with respect to cooling provisioning system modules of FIG. 5.

In one embodiment, the cooling provisioning system 770 controls the speed of the fans 730 or movement of louvers to distribute more or less air flow to a slot depending on the amount of heat being dissipated by the computer system in the slot. Heat dissipation may be measured using temperature sensors, such as the temperature sensors 740a and 740b. An amount of cooling fluid distributed to each of the slots 701-712 may be substantially proportional to an amount of heat being dissipated by each computer system mounted in the slots 701-712.

Also, the cooling system components may be designed based on nominal heat dissipation of the computer systems mounted in the slots 701-712. For example, the size of the blower 720 selected to be implemented in the rack system 700 may be based on nominal heat dissipation rather than maximum heat dissipation of the computer systems housed in the rack system. If 100 cfm of air flow is needed, based on nominal heat dissipation, to cool each of twelve computer systems mounted in the slots 701-712 respectively, then the blower 720 is selected or designed to generate at least 1200 cfm of air flow.

A power supply 750 supplies power to the computer systems in the slots 701-712. The power provisioning system 760 controls power consumption of the computer systems in the slots 701-712. The power supply may be designed based on the nominal power consumption the of computer systems used in the rack 700. Similarly to the power provisioning system 526 of FIG. 5, the power provisioning system 760 compares the power consumption of the computer systems in the slots 701-712 to a threshold. If the threshold is exceeded, the power provisioning system 760 may place one or more components of the computer systems in the slots 701-712 in a lower-power state. If the computer systems in the slots 701-712 are not substantially utilizing the power capacity of the power supply 750, then the power provisioning system may place one or more components currently in a lower-power state into a higher-power state.

The power provisioning system 760 is in communication with the cooling provisioning system 770. For example, the power provisioning system 760 and the cooling system 770 may be connected via a communication bus (not shown). The cooling system for the rack 700 may be designed based on nominal heat dissipation of the computer systems housed therein, and there may be some instances when insufficient cooling fluid is available to cool the computer systems. The cooling provisioning system 770 determines whether a sufficient amount of cooling resources are available to cool the computer systems in the rack 700. For example, the cooling provisioning system 770 may compare the amount of cooling fluid being provided to cool the computer systems to a threshold associated with the maximum capacity of the cooling system. If the threshold is exceeded, then the cooling provisioning system 770 may transmit a request to the power provisioning system 760 to place one or more components in the rack 700 in a lower-power state.

The cooling provisioning system 770 also determines whether excess cooling resources are available to cool the computer systems in the rack 700. For example, the cooling provisioning system 770 compares the amount of cooling fluid being provided to the computer systems in the rack 700 to an excess cooling threshold. If the amount of fluid is less than the threshold, then the cooling provisioning system 770 transmits a message to the power provisioning system 760 indicating that excess cooling resources are available. The power provisioning system 760 may then place one or more components in a higher-power state.

Generally, power consumption is proportional to heat dissipation of the computer systems in the rack. Therefore, when excess cooling resources are available (e.g., when minimal heat is being dissipated), power consumption of the components may be increased to improve performance, such as increasing the clock speed of a processor.

Tables 1-3 below illustrate the relationship between power consumption and heat dissipation of the computer systems in the slots 701-712. The tables 1-3 illustrate examples of volumetric air flow (cfm) distributed to each of the slots 701-712 by the cooling provisioning system 770. The volumetric air flow per slot may be based on the heat dissipation and the power consumption of a computer system in each respective slot. Table 1 illustrates exemplary air flow provided to the slots 701-712 for a cooling system nominally designed to produce 1200 cfm of air flow.

TABLE 1

| SLOT | CFM | Power Consumption (W) |
| --- | --- | --- |
| 701 | 125 | 1000 |
| 702 | 125 | 1000 |
| 703 | 125 | 1000 |
| 704 | 125 | 1000 |
| 705 | 125 | 1000 |
| 706 | 125 | 1000 |
| 707 | 75 | 600 |
| 708 | 75 | 600 |
| 709 | 150 | 1200 |
| 710 | 150 | 1200 |
| 711 | 0 | Off |
| 712 | 0 | Off |

As shown in Table 1, slots 701-706 receive 125 cubic feet per minute (cfm) volumetric air flow, because computer systems mounted in those slots are dissipating 25% more heat above nominal heat dissipation (e.g., 100 cfm). Similarly, slots 707-708 receive 75 cfm of air flow, and slots 709-710 receive 150 cfm of air flow based on the measured heat dissipation of computer systems mounted in the respective slots. Slots 711-712 receive substantially no cooling fluid. Computer systems mounted in the slots 711-712, for example, may have been placed in a lower-power state by the cooling provisioning system 426 of FIG. 4 to allow a sufficient amount of cooling fluid to be available for computer systems mounted in the remaining slots 701-710.

The third column of table 1 lists the power consumption for the computer systems in the slots 701-712. The power consumption may be calculated from the air flow and vice versa using equation (1).

$$V = 1.8 Q / (\text{delta } T) \qquad \text{Equation (1)}$$

In equation (1), V is the volumetric air flow (e.g., cfm), Q is the power consumption, and delta T is the measured heat dissipation (e.g., change in temperature between an air inlet and an air outlet, such as measured by the temperature sensors 740a and 740b respectively). Assuming a delta T of 15 degrees Celsius (C), for example, the cooling provisioning system 770 may calculate the volumetric air flow needed to cool each computer system in the slots 701-712 from the power consumption of each computer system.

In one embodiment, the power provisioning system 760 may determine power consumption of each computer system using power measuring circuits known in that art or from power consumption measurements received from the computer systems. The power provisioning system 760 may transmit the power consumption of each computer system to the cooling provisioning system 770. The cooling provisioning system 770 may calculate air flow based on the received power consumption measurements. In another embodiment, the cooling provisioning system 770 calculates the airflow needed for cooling a computer system based on the measured heat dissipation of the computer system. The air flow and the heat dissipation are substantially proportional, and may be calculated using known techniques. Power consumption may then be calculated using equation (1). Also, the cooling provisioning system 770 may include a margin of error when determining air flow provided to the slots 701-712.

Table 2 illustrates an example when the power consumption of the computer systems in the slots 709 and 710 increases by 400 W each.

TABLE 2

| SLOT | CFM | Power Consumption (W) |
|---|---|---|
| 701 | 125 | 1000 |
| 702 | 125 | 1000 |
| 703 | 125 | 1000 |
| 704 | 125 | 1000 |
| 705 | 125 | 1000 |
| 706 | 5 | 40 |
| 707 | 75 | 600 |
| 708 | 75 | 600 |
| 709 | 210 | 1600 |
| 710 | 210 | 1600 |
| 711 | 0 | Off |
| 712 | 0 | Off |

The cooling system 770 redistributes cooling fluid to account for the increase in power consumption (and as a result heat dissipation) of the computer systems in the slots 709 and 710. Based on equation, approximately 192 cfm of air flow is needed per slot for slots 9 and 10 to cool the computer systems mounted therein and consuming 1600 W of power. The cooling provisioning system 770 may add approximately 18 cfm for each of slots 9 and 10 to account for error.

In order to increase the air flow for the slots 709 and 710 substantially proportionally to the increased power consumption, the power consumption for other components/computer systems in the rack 700 must be reduced (in this case by 120 cfm), because no spare cooling resources are available (i.e., 1200 cfm maximum cooling capacity). Accordingly, the cooling provisioning system 770 transmits a message to the power provisioning system indicating that insufficient cooling resources are available. In response to the message, the power provisioning system 760 reduces the power consumption of the computer system in slot 6 to 40 W. For example, the power provisioning system 760 may instruct a processor for slot 6 to reduce its clock speed or instruct the processor not to consume more than 40 W. Volumetric air flow for slot 6 is thus reduced to 5 cfm.

Table 3 illustrates another redistribution of cooling fluid for the rack 700.

TABLE 3

| SLOT | CFM | Power Consumption (W) |
|---|---|---|
| 701 | 125 | 1000 |
| 702 | 125 | 1000 |
| 703 | 125 | 1000 |
| 704 | 125 | 1000 |
| 705 | 125 | 1000 |
| 706 | 25 | 200 |
| 707 | 75 | 600 |
| 708 | 75 | 600 |
| 709 | 200 | 1600 |
| 710 | 200 | 1600 |

TABLE 3-continued

| SLOT | CFM | Power Consumption (W) |
|---|---|---|
| 711 | 0 | Off |
| 712 | 0 | Off |

The cooling provisioning system 770 may determine that a 10 cfm margin of error for each of slots 9 and 10 is not needed. For example, delta T assumed to be 15 degrees C. was actually measured to be 13.5 degrees C. Therefore, as shown in table 3, 20 additional cfm of air flow is redistributed to slot 6. Accordingly, the power provisioning system 760 may increase power consumption (e.g., place one or more components in a higher-power state for the computer system mounted in slot 706) in response to excess cooling resources being available. Then, the cooling provisioning system 770 redistributes the cooling resources in response to the increased power consumption and heat dissipation (e.g., 25 cfm for slot 706).

Figure 8:
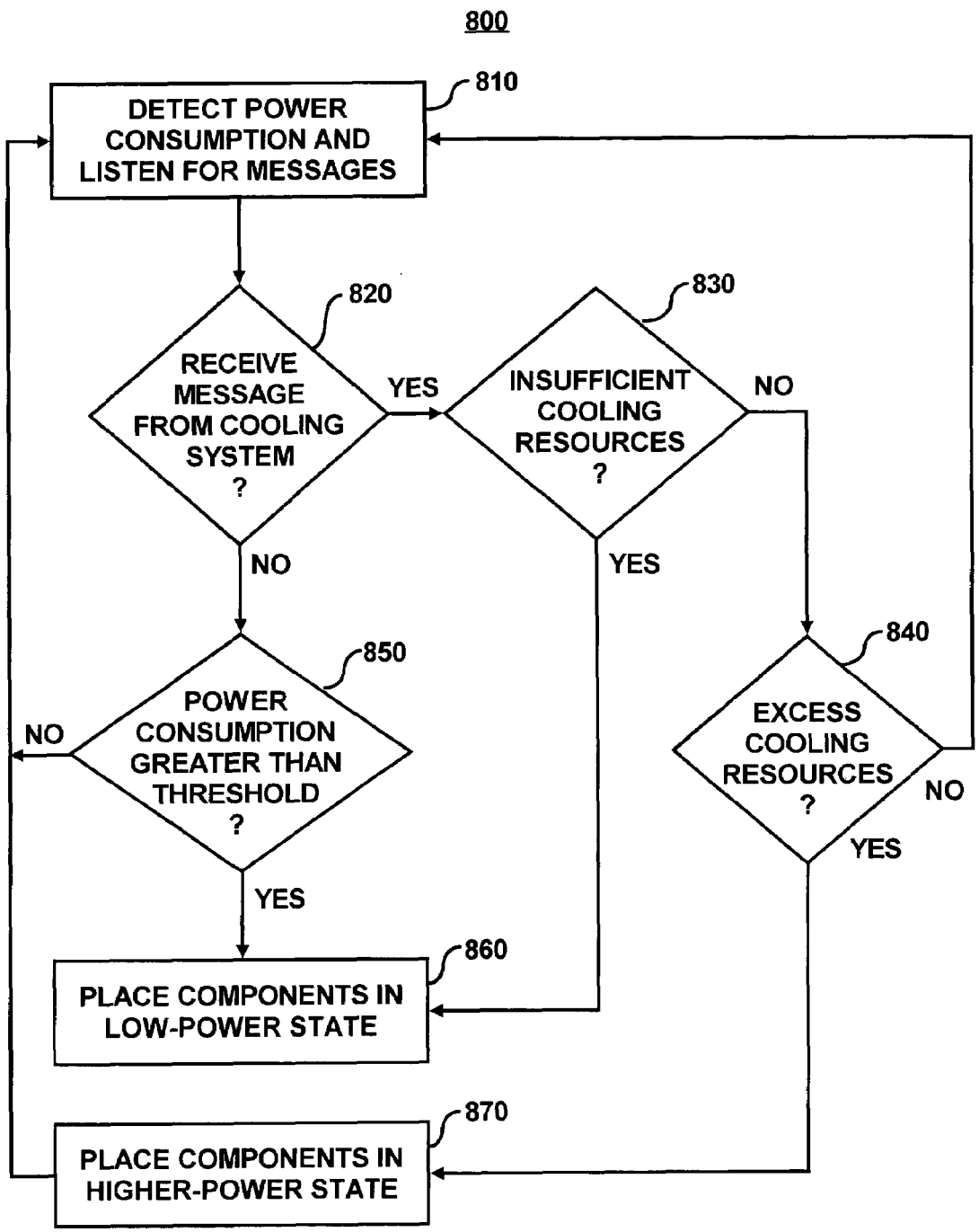
FIG. 8 illustrates a flow chart of a method for controlling power consumption, according to an embodiment of the invention.

FIG. 8 illustrates a method 800 for controlling power consumption for a multi-computer system, according to an embodiment of the invention. FIG. 8 is described with respect to the system shown in FIG. 4 by way of example and not limitation. The method 800 may be applicable to substantially any multi-computer system, including the systems shown in FIGS. 6 and 7. Furthermore, the steps of the method 800 may be performed by software, hardware or a combination thereof.

At step 810, the power provisioning system 426 determines the power consumption of the computer systems 410 and waits for messages from the cooling provisioning system 436 regarding the cooling resources. At step 820, the power provisioning system 426 determines whether it has received a message from the cooling provisioning system 436 regarding the cooling resources. If a message is received, the power provisioning system determines whether the message indicates that insufficient cooling resources are available for cooling the computer systems 410 (step 830) or whether the message indicates that excess cooling resources are available (step 840).

If insufficient cooling resources are available, the power provisioning system 426 reduces the power consumption of the computer systems 410 by placing one or more of the components 412$a$ . . . $n$ in a lower-power state, which may include shutting down an entire computer system (step 860). If excess cooling resources are available, as determined at step 840, the power provisioning system 426 may place one or more of the components 412$a$ . . . $n$, currently in a lower-power state, in a higher-power state (step 870), which generally results in better performance for the components placed in a higher-power state. However, if the power system 420 and the cooling system 430 are not proportionally designed, then an increase in cooling resources may not be indicative of a decrease in power consumption, and a decrease in cooling resources may not be indicative of an increase in power consumption. In these instances, cooling resources and power consumption should be measured to accurately determine whether power consumption should be increased or decreased. For example, if excess cooling resources are available, the power consumption of the computer systems 410 is compared to a lower threshold (described above as the second threshold) to determine whether excess power is available. If excess cooling resources and excess power is available, the power provisioning system 426 may place one or more components 412$a$ . . . $n$ in a higher-power state. Likewise, if insufficient cooling resources are available, power consumption may be compared to an upper threshold to determine whether the power demand of the computer systems 410 is excessive. If the power demand is excessive, then one or more of the components 412a . . . n may be placed in a lower-power state.

If the power provisioning system 426 does not receive a message from the cooling provisioning system, as determined at step 820, the power provisioning system 426 compares the power consumption of the computer systems 410 to a threshold related to the maximum power output of the power supply 422 (step 850). If the threshold is exceeded, the power provisioning system 426 places one or more of the components 412a . . . n in a lower-power state to reduce power consumption. Some components 412a . . . n may have multiple lower-power states, and the power provisioning system 426 may reduce the power consumption of those components to a lower-power state.

It will be apparent to one of ordinary skill in the art that some of the steps of the method 800 may be performed in different orders. For example, step 850 may be performed prior to steps 820-840 or substantially simultaneously. The power provisioning system 426 may periodically compare the power consumption of the computer systems 410 to the threshold, and the power provisioning system 426 may substantially simultaneously receive messages from the cooling provisioning system 436.

Figure 9:
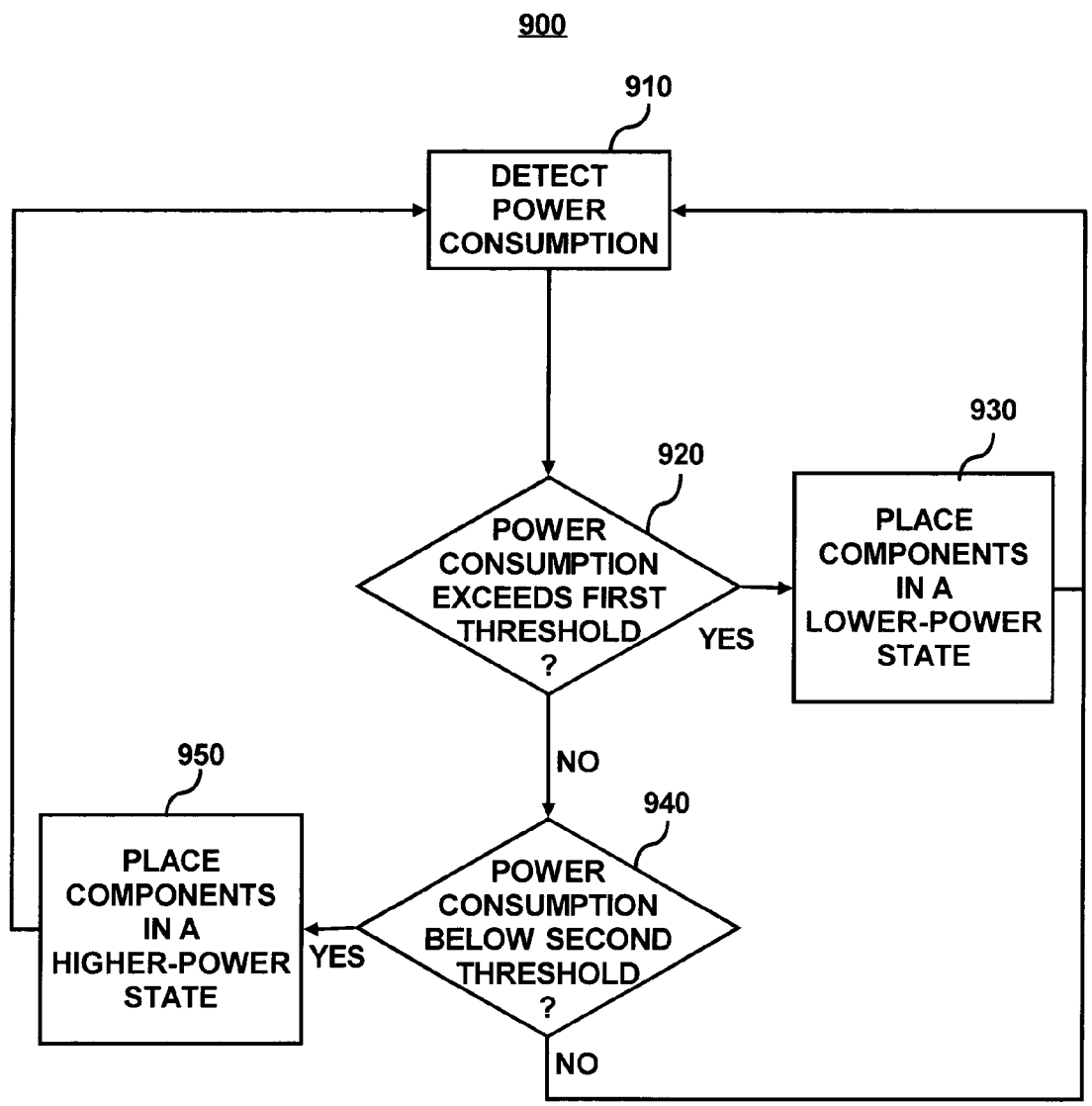
FIG. 9 illustrates a flow chart of a method for controlling power consumption, according to another embodiment of the invention.

FIG. 9 illustrates another embodiment of a method 900 for controlling power consumption for one or more computer systems. The method 900 is described below with respect to FIG. 4 by way of example and not limitation. Furthermore, the method 900 is applicable to a single computer system, such as shown in FIGS. 2 and 3. Furthermore, the steps of the method 900 may be performed by software, hardware or a combination thereof.

At step 910, the power provisioning system 426 determines the power consumption of the computer systems 410. This may include measuring the output power of the power supply 422. At step 920, the power provisioning system 426 determines whether the power consumption of the computer systems 410 is greater than a first threshold. In one embodiment, the first threshold is associated with the maximum power capacity of the power supply 422. If the power consumption is greater than the first threshold, then the power consumption of the computer systems 410 is reduced (step 930), for example, by placing one or more of the components 412a . . . n in a lower-power state. If the power consumption is not greater than the first threshold, then the power consumption is compared to a second threshold (step 940). According to an embodiment, the second threshold is associated with excess power that may be available from the power supply 426 for use by the computer systems 410. If the power consumption is below the second threshold, then one or more of the components 412a . . . n may be placed in a higher-power state (step 950), which may improve performance of a respective computer system. If the power consumption is not less than the second threshold then the power state of the components 412a . . . n is not changed.

The steps 910-950 may be substantially continuously or periodically repeated to control power consumption of the computer systems 410. Also, it will be apparent to one of ordinary skill in the art that some of the steps of the method 900 may be performed in different orders. For example, step 940 may be performed prior to step 920 or substantially simultaneously.

Figure 10:
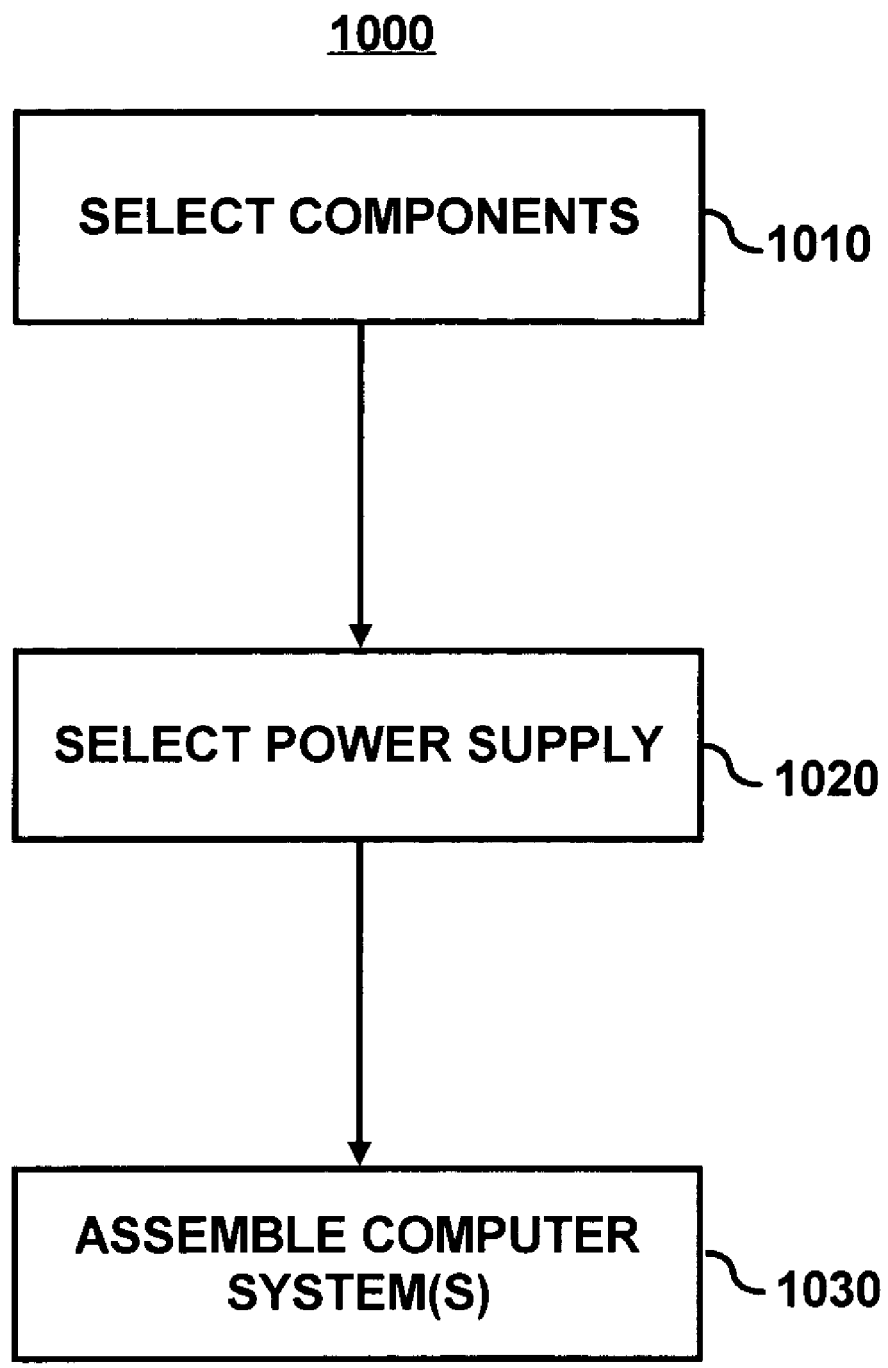
FIG. 10 is a flowchart of a method for designing a computer system, according to an embodiment of the invention.

FIG. 10 illustrates a method 1000 for designing a computer system based on nominal power consumption, according to an embodiment of the invention. At step 1010 components are selected. At step 1020, one or more power supplies are selected for powering the computer system.

For example, if the nominal power consumption of the computer system is determined or estimated to be 50 Watts, a 50-70 Watt power supply may be selected. The maximum power consumption may be determined or estimated to be 100 Watts, however, the computer system likely will not require all 100 Watts for a substantial majority of the computer system's operating time. Therefore, the nominal power consumption may be used to select the power supplie(s).

If a multi-computer system is being designed, such as the multi-computer systems shown in FIGS. 6 and 7, a designer may design the system based on nominal power consumption of the computer systems in the rack. If, for example, ten computer systems have a nominal power consumption of 50 Watts and a maximum power consumption of 100 Watts each, a 500 Watt power supply may generate sufficient power for all ten computer systems based on nominal power consumption. However, if the system were designed based on maximum power consumption, the 500 Watt power supply may only support five computer systems.

At 1030, the computer system or multi-computer system is assembled. The assembled computer system may include a provisioning system (e.g., the provisioning system 40 or 540 shown in FIGS. 1 and 5 respectively) for controlling power consumption. The provisioning system may be used to prevent power demand from exceeding the maximum power output of the power supply.

What has been described and illustrated herein are embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of controlling power consumption for at least one computer system, the method comprising:

detecting an amount of power consumed by the at least one computer system;

comparing the amount of power consumed by the at least one computer system to a threshold, wherein the threshold is based on a maximum power output of the power supply, wherein the maximum power output of the power supply is based on an average power consumption of the at least one computer system;

placing one or more components of the at least one computer system in a lower-power state to reduce power consumption in response to the amount of power consumed by the at least one computer system exceeding the threshold;

determining whether placing the one or more components in a higher-power state will cause the power consumption of the at least one computer system to exceed the threshold based on the maximum power consumption of the at least one computer system;

comparing the amount of power consumed by the at least one computer system to a second threshold; and placing the one or more components of the at least one computer system, currently in a lower-power state, in a higher-power state, such that the one or more components consumes more power, in response to the amount of power consumed by the at least one computer system being less than the threshold and the second threshold.

2. The method of claim 1, wherein a cooling system is operable to cool the at least one computer system, the method further comprising:
determining whether insufficient cooling resources are available for cooling the at least one computer system; and
placing at least one component of the at least one computer system in a lower-power state in response to insufficient cooling resources being available to cool the at least one computer system.

3. The method of claim 2, further comprising:
determining whether excess cooling resources are available for cooling the at least one computer system; and
placing the at least one component of the computer system currently in a lower-power state in a higher-power state, such that the at least one component consumes more power, in response to excess cooling resources being available.

4. The method of claim 3, wherein determining whether excess cooling resources are available for cooling the at least one computer system comprises determining whether an amount of cooling fluid distributed to the at least one computer system is less than an excess cooling fluid threshold.

5. The method of claim 2, wherein determining whether insufficient cooling resources are available for cooling the at least one computer system comprises determining whether an amount of cooling fluid distributed to the at least one computer system exceeds a threshold associated with the maximum capacity of the cooling system.

6. The method of claim 1, wherein one or more of the threshold based on the maximum power output of the power supply and the second threshold is determined such that a minimal change in power consumption does not result in changing a power state of the at least one component.

7. The method claim 1, wherein placing the at least one component in a lower-power state comprises:
determining a cooling efficiency of components in the at least one computer system; and
selecting one or more of the components to be placed in a lower-power state based on an amount of energy needed to cool the one or more components; wherein a component requiring more energy to be cooled is selected before a component requiring less energy to be cooled.

8. The method of claim 1, wherein the at least one computer system comprises multiple computer systems running applications, the method further comprising:
prioritizing applications running on the multiple computer systems; wherein
the step of placing one or more components in a lower-power state further comprises identifying one of the multiple computer systems running one or more low priority applications, and placing at least one component in the identified computer system in a lower-power state.

9. The method of claim 1, wherein a processor for the at least one computer system is operable to be placed in multiple lower-power states, each being associated with a lower clock speed, and placing one or more components of the at least one computer system in a lower-power state comprises placing the processor in one of the multiple lower-power states.

10. The method of claim 9, wherein placing the processor in one of the multiple lower-power states comprises instructing the processor not to consume more than a predetermined amount of power.

11. The method of claim 1, further comprising:
storing information including components in the at least one computer system, power state of the components, power consumption of the components, and priority information associated with prioritizing components placed in a lower-power state;
and placing one or more components of the at least one computer system in a lower-power state comprises determining the one or more components to be placed in a lower-power state based on the stored information.

12. The method of claim 11, further comprising:
placing the at least one component of the computer system currently in a lower-power state in a higher-power state based on the stored information.

13. The method of claim 1, wherein placing one or more components in a low-power state comprises reducing power consumption of one or more of a processor, a floating point unit, one or more storage devices, main memory, and a cache or a portion of a cache.

14. The method of claim 1, wherein the maximum power output of the power supply is approximately equal to or within a predetermined tolerance of the average power consumption of the at least one computer.

15. A power system generating power for at least one computer system, the power system comprising:
at least one power supply operable to provide power for the at least one computer system;
a power monitor operable to determine the power consumption of the at least one computer system; and
a power provisioning system operable to compare the power consumption of the at least one computer system to a threshold associated with a maximum capacity of the power supply, and further operable to place one or more components of the at least one computer system in a lower-power state in response to the measured power output exceeding the threshold, and further operable to receive messages from a cooling system and to place the one or more components of the at least one computer system in the lower-power state in response to receiving a message from the cooling system indicating that insufficient cooling resources are available for cooling the at least one computer system and to place at least one of the one or more components from the lower-power state to a higher-power state in response to receiving a message from the cooling system indicating that excess cooling resources are available;
wherein the maximum capacity of the power supply is based on an average power consumption of the at least one computer system.

16. The power system of claim 15, wherein the maximum capacity of the at least one power supply is approximately equal to the average power consumption of the at least one computer system.

17. The power system of claim 15, wherein the one or more components comprise a processor, and the power provisioning system is operable to instruct the processor to reduce clock speed for reducing power consumption.

18. The power system of claim 15, wherein the one or more components comprises a processor, and the power provisioning system is operable to instruct the processor to reduce power consumption of the processor to a calculated value or range of values.

19. The power system of claim 15, wherein the one or more components comprises a processor operable to be placed in one of multiple lower-power states.

20. The power system of claim 15, wherein the at least one computer system comprises multiple computer systems, and the power provisioning system is operable to prioritize the multiple computer systems for placement in a lower-power state based on an importance of applications executing on the multiple computer systems.

21. The power system of claim 15, further comprising a repository storing power state information for the one or more of components in the at least one computer system, wherein the power provisioning system is operable to utilize the power state information to identify a component of the one or more components to be placed in a lower-power state or a higher-power state.

22. The power system of claim 21, wherein the power state information comprises one or more of power consumption of the one or more components and priority information associated with prioritizing the one or more components for placing changing the power state of the one or more components.

23. The power system of claim 15, wherein the power provisioning system is operable to determine whether the amount of power consumed by the at least one computer system falls below a second threshold, and further operable to place at least one of the one or more components in a higher-power state in response to the amount of power consumed by the at least one computer system falling below the second threshold.

24. The power system of claim 15, wherein the at least one computer system comprises multiple computer systems receiving power via a power bus, and the power provisioning system is operable to disconnect a portion of a power bus to place one of the multiple computer systems in a lower-power state.

25. The power system of claim 15, wherein the power monitor is connected to the at least one power supply to measure the output power of the at least one power supply for determining the power consumption of the at least one computer system.

26. The power system of claim 15, wherein the at least one computer system comprises multiple computer systems connected to the at least one power supply via a power bus, and the power monitor is connected to the power bus to measure the power consumption of the multiple computer systems.

27. The power system of claim 15, wherein the one or more components comprise one or more of a processor, a floating point unit, one or more storage devices, one or more memory ICs, and a cache or a portion of a cache.

28. The method of claim 15, wherein the maximun power output of the power supply is within a predetermined tolerance of the average power consumption of the at least one computer.

29. A system comprising:
multiple computer systems housed in an enclosure;
a cooling system operable to distribute cooling fluid to the multiple computer systems in the enclosure based on one or more of the power consumption and heat dissipation of the multiple computer systems; and
a power system connected to the cooling system and including a power supply operable to generate power for the multiple computer systems and a power provisioning system, wherein the power provisioning system is operable to control power consumption of at least one of the multiple computer systems based on the availability of cooling resources for cooling the multiple computer systems, to compare the power consumption of the multiple computer systems to a threshold, wherein the threshold is based on a maximum power output of the power supply, wherein the maximum power output of the power supply is based on an average power consumption of the multiple computer systems, and wherein the power provisioning system is further operable to reduce the power consumption of at least one of the multiple computer systems in response to the power consumption exceeding the threshold;
wherein the cooling system is operable to transmit a message to the power provisioning system indicating insufficient cooling resources are available for cooling the multiple computer systems or excess cooling resources are available for cooling the multiple computer systems;
the power provisioning system is operable to reduce power consumption of at least one of the multiple computer systems in response to receiving a message indicating insufficient cooling resources are available for cooling the multiple computer systems; and
the power provisioning system is operable to increase power consumption of at least one of the multiple computer systems in response to receiving a message indicating excess cooling resources are available for cooling the multiple computer systems.

30. The system of claim 29, wherein the cooling system is designed based on a nominal heat dissipation of the multiple computer systems.

31. The system of claim 29, wherein the enclosure is a rack.

32. The system of claim 29, wherein the enclosure is a data center.

33. An apparatus controlling power consumption of at least one computer system using a power supply means, the apparatus comprising:
means for determining an amount of power consumed by the at least one computer system;
means for comparing the amount of power to a threshold, wherein the threshold is based on the maximum power output of the power supply means, wherein the power supply means has a maximum power output based on an average power consumption of the at least one computer system;
means for placing one or more components of the at least one computer system in a lower-power state to reduce power consumption in response to the power consumption of the at least one computer system exceeding the threshold;
means for cooling the at least one computer system, wherein the means for cooling is operable to determine whether excess or insufficient cooling resources are available for cooling the at least one computer system and to transmit a message to the means for placing the one or more components of the at least one computer system in the lower-power state indicating whether excess or insufficient cooling resources are available for cooling the at least one computer system; and
the means for placing the at least one component of the computer system currently in a lower-power state is further operable to place the at least one component in a higher-power state, such that the at least one component consumes more power, in response to receiving the message indicating excess cooling resources being available and to place the at least one component in the lower-power state in response to receiving the message indicating insufficient cooling resources being available.

34. The apparatus of claim 33, wherein the means for cooling is further operable to determine whether insufficient cooling resources are available for cooling the at least one computer system and the means for placing at least one component of the at least one computer system in a lower-power state is further operable to place the at least one component in a lower-power state in response to insufficient cooling resources being available to cool the at least one computer system.

35. The apparasus of claim 33, wherein the means for comparing the amount of power consumed by the at least one computer system to a threshold is further operable to compare the amount of power consumed by the at least one computer system to a second threshold;

and the means for placing the at least one component of the computer system in a lower-power state is further operable to place the at least one component in a higher-power state, such that the at least one component consumes more power, in response to the amount of power consumed by the at least one computer system being less than the second threshold.

\* \* \* \* \*

UNITED STATES PATENT AND TRADEMARK OFFICE
CERTIFICATE OF CORRECTION

PATENT NO. : 7,272,732 B2  Page 1 of 1
APPLICATION NO. : 10/608206
DATED : September 18, 2007
INVENTOR(S) : Keith Istvan Farkas et al.

It is certified that error appears in the above-identified patent and that said Letters Patent is hereby corrected as shown below:

In column 5, line 7, delete "die" and insert -- the --, therefor.

In column 25, line 39, in Claim 7, after "method" insert -- of --.

In column 25, line 63, in Claim 9, after "each" insert -- lower-power state --.

In column 27, line 21, in Claim 22, delete "placing" before "changing".

In column 27, line 51, in Claim 28, delete "maximun" and insert -- maximum --, therefor.

In column 29, line 13, in Claim 35, delete "apparasus" and insert -- apparatus --, therefor.

Signed and Sealed this

Twenty-third Day of June, 2009

JOHN DOLL
*Acting Director of the United States Patent and Trademark Office*